United States Patent [19]
Tajika et al.

[11] Patent Number: 5,907,337
[45] Date of Patent: *May 25, 1999

[54] INK JET RECORDING METHOD AND APPARATUS

[75] Inventors: Hiroshi Tajika; Masami Ikeda; Hiromitsu Hirabayashi, all of Yokohama; Jiro Moriyama, Kawasaki; Toshio Kashino, Chigasaki; Noribumi Koitabashi; Yuji Akiyama, both of Yokohama; Takeshi Okazaki, Sagamihara; Masaaki Izumida, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/264,685

[22] Filed: Jun. 23, 1994

[30] Foreign Application Priority Data

Jun. 23, 1993 [JP] Japan ..................................... 5-152252
Jun. 13, 1994 [JP] Japan ..................................... 6-130302

[51] Int. Cl.⁶ ............................... B41J 2/145; B41J 2/15; B41J 2/21
[52] U.S. Cl. ............................................... 347/40; 347/43
[58] Field of Search ................................... 347/43, 40, 41

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,642,653 | 2/1987 | Ito et al. | 347/15 |
| 4,692,773 | 9/1987 | Saito et al. | 347/15 |
| 4,723,129 | 2/1988 | Endo et al. | 347/56 |
| 4,740,796 | 4/1988 | Endo et al. | 347/56 |
| 4,809,016 | 2/1989 | Padalino | 347/41 |
| 4,812,859 | 3/1989 | Chan et al. | 347/43 |
| 5,173,717 | 12/1992 | Kishida et al. | 347/12 |
| 5,280,310 | 1/1994 | Otsuka et al. | 347/12 |
| 5,430,469 | 7/1995 | Shioya et al. | 347/43 |

FOREIGN PATENT DOCUMENTS

| | | |
|---|---|---|
| 0510934 | 10/1992 | European Pat. Off. . |
| 0517543 | 12/1992 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| WO91008902 | 6/1991 | WIPO . |

*Primary Examiner*—N. Le
*Assistant Examiner*—Thinh Nguyen
*Attorney, Agent, or Firm*—Fitzpatrick, Cella, Harper & Scinto

[57] ABSTRACT

An ink jet recording method using a number of ejection outlets for ejecting ink includes grouping a number of ejection outlets into a plurality of groups such that ejection regions are partly overlapped; and supplying driving signals in such an order that ejection regions of groups of ejection outlets are partly overlapped.

15 Claims, 31 Drawing Sheets

P1 : PRE HEAT PULSE (=T1) (PWM)
P2 : INTRVL (=T2−T1)
P3 : MAIN HEAT PULSE (=T3−T2)
Vop : DRV VOLT

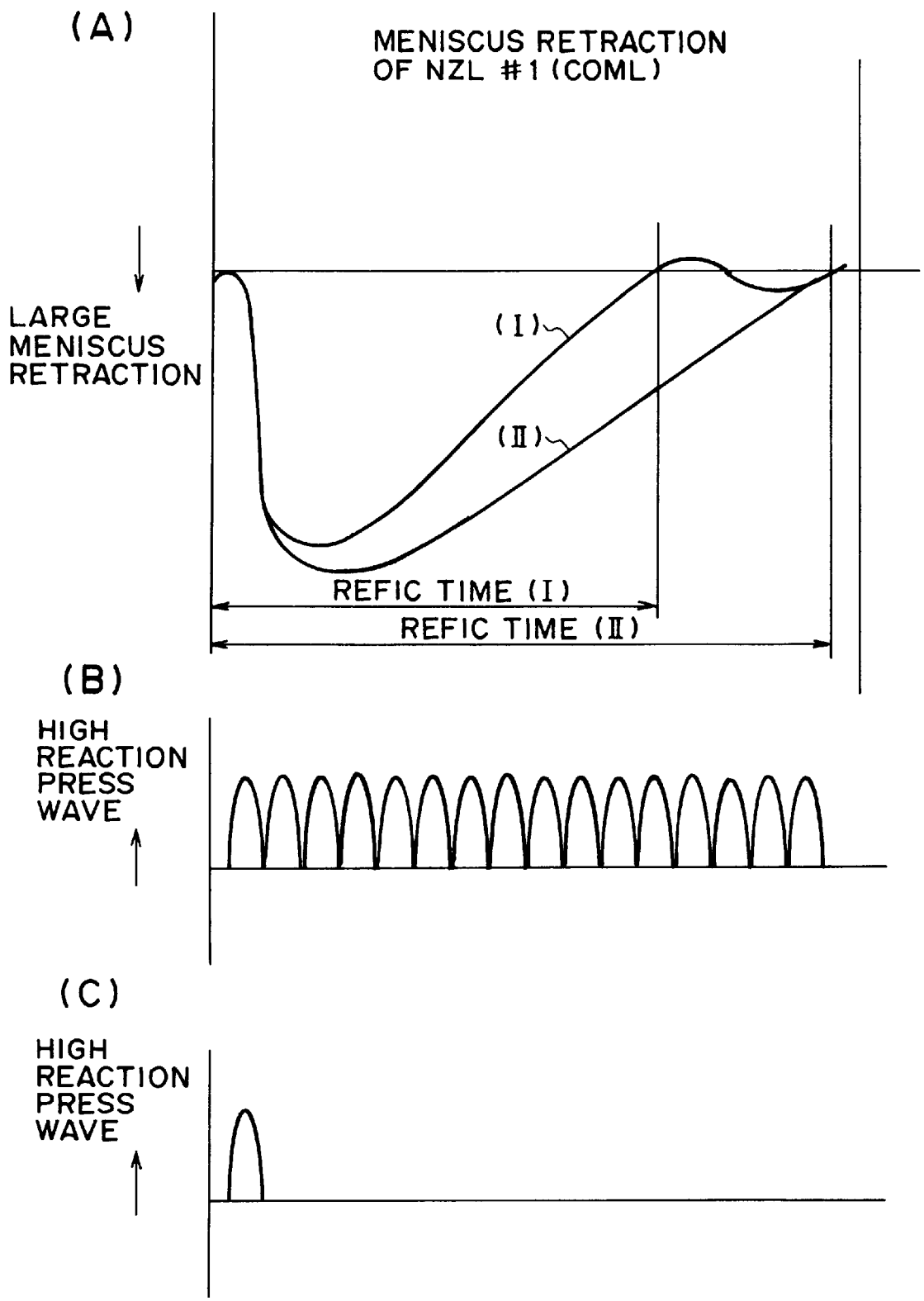
F I G. 12

|         | Lw (μm)      | Dr (μm)      | PWM WDTH (DELAY) (μs) |
|---------|--------------|--------------|-----------------------|
| FIG. 17 | 11.88 (Y)    | 7.92 (Y)     | 5.2 (N)               |
| FIG. 18 | 23.77 (N)    | 15.85 (N)    | 10.4 (Y)              |
| FIG. 19 | 14.17 (Y)    | 7.09 (Y)     | 9.3 (Y)               |

FIG. 20

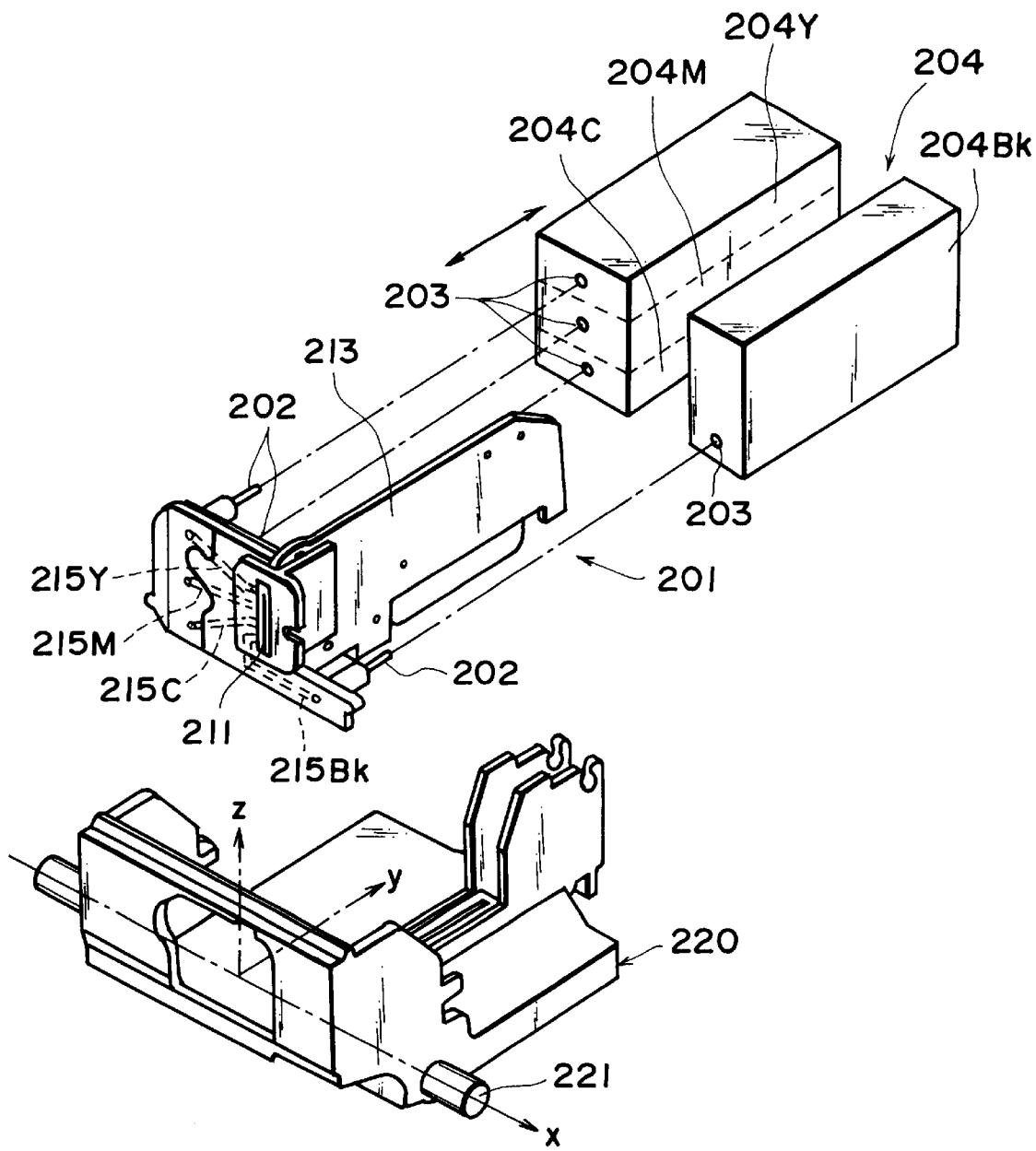
F I G. 26

INK JET RECORDING METHOD AND APPARATUS

FIELD OF THE INVENTION AND RELATED ART

The present invention relates to an ink jet recording method and apparatus in which ink is ejected from a recording head to a recording material to effect the recording.

In a recording apparatus such as a printer, copying machine, facsimile machine or the like, an image constituted by a dot pattern is recorded on a recording material such as paper or a thin sheet of plastic material in accordance with image information. The recording apparatus is classified depending on the recording system into an ink jet type, a wire dot type, a thermal type, a laser beam type and the like. Among them, the ink jet type (ink jet recording apparatus) is such that ink (recording liquid) droplets are ejected through ejection outlets of a recording head, to effect the recording by deposition of the ink on the recording material.

Recently, various types of recording apparatuses are used, and high speed recording, high resolution, high image quality, low noise or the like are desired for these recording apparatuses. To meet the requirement, the ink jet recording apparatus is suitable. Since the non-contact printing is possible because of ejecting the ink from the recording head, very stabilized images can be printed.

However, it uses ink which is liquid, and therefore, if the recording head is driven at or adjacent a critical printing speed, various hydromechanism inconveniences arise. In addition, since the ink is liquid, the physical states thereof such as viscosity or surface tension or the like change due to ambient temperature or the time period in which it is not used. For example, even if the printing is possible in an initial state, the printing may become difficult due to the increase of the vacuum due to the decrease of the ambient temperature and/or the decrease of the remaining quantity of the ink in the container, or the like.

In many prior art printers, a plurality of nozzles are all driven in as of a short period as possible so as to record a vertical line as a straight line. In most cases, several tens of nozzles are grouped into blocks each containing several—16 nozzles approximately, and they are simultaneously driven to accomplish high speed operation. In this case, if the apparatus is driven for critical ejection period, the refilling of the ink to the nozzle does not quick enough with the result that the next ejection starts before the ink is sufficiently refilled. If this occurs, improper ejection or extreme reduction of the ejected quantity, occur. Particularly when a great number of nozzles are driven in a short period of time (including simultaneous drive), a vacuum level in a common liquid chamber temporarily increases too much, with the result that the refilling is not quick enough. For example, the next ejection starts when the ink buldges out of the nozzle surface as a result of large vibration. Then, the ink is splashed. Generally, this tends to occur near maximum acceleration speed of the ink meniscus.

As disclosed in U.S. Pat. Nos. 5,173,717, 5,280,310 or U.S. Ser. No. 859,332, the ink is prevented from simultaneously ejecting through adjacent ejection outlets. By doing so, the flexibility of the ink supply direction from the common chamber to the nozzles is increased so that the ink supply quantity to the nozzle inlets is simultaneously increased.

By the phase difference of the vibration in the adjacent nozzles, the refilling speed can be increased by the damping of vibration, and the refilling speed can be increased by pulsewise motion. Particularly, the improvement in refilling the other nozzles by the ejection reaction pressure wave is significant.

As regards the improvements provided by the ejection reaction pressure wave, there are two significant factors. One of them is that the ink in the nozzle with which the ejection is going to complete, that Is, the nozzle with which the ink therein is ejected but the maximum meniscus retraction has not been reached, is given a reaction pressure wave by driving another nozzle preferably adjacent nozzle, by which the inertia of retraction of the meniscus is attenuated before the maximum meniscus retraction is reached. By doing so, the required refilling distance is reduced, thus reducing the refilling time.

Another effect is that multiple ejection reaction pulses are imparted to the nozzle with which the refilling is being in the process after the maximum meniscus retraction is reached, by which the refilling speed itself is increased. Hereinafter, this driving system is called offset drive.

As for the means for the offset drive, the drive timings are offset for every other dots, so that the even number nozzles and odd number nozzles are driven separately. Alternatively, the drive timings may be offset for every other two dots or other multiples of dots.

In the case of a printer for printing monochromatic or color images, various stabilities such as dot reproducibility, density stability, tone reproducibility, color reproducibility or the like, are desired, and are met by drive control method.

Particularly in the case of a heating type ink jet recording apparatus, the ink ejection property (ejection quantity, ejection speed, bubble formation, refilling state or the like) varies due to the ambient temperature or due to the self-rise by the printing action. For the purpose of maintaining the stability or stabilities, ejection amount control method may use multiple pulses. In addition, an apparatus using a combination of the offset control and the ejection amount control has been developed.

However, the conventional offset drive involves the following problems.

1. If the nozzle number N (block number (i)×segment number (j)) is increased, the number of nozzles J simultaneously driven is increased with the result that the influence of the voltage drop Vdrop or the influence of hydraulic cross-talk, are increased, and that a block open period Tb (open time period per 1 block) is reduced due to the increase of the number of groups (block number i.). If the offset drive is simply carried out, the block open period becomes one half with the result of difficulty in assuring the control width of the ejection quantity.

2. By increasing further the drive frequency, the block open period monotonely decreases.

Therefore, if the above 1 and 2 are combined, the block open period extremely decreases with the result of difficulty in assuring the optimum control time period for the purpose of measurement against the hydraulic stroke. In addition, by the increase of the energy per unit type, the flexibility for the ejection amount control for absorbing temperature rise of the head by accumulation of generated heat, is not maintained. More particularly, since the open period of the multiple pulse for each group of ejections becomes shorter, and therefore, the ejection amount variation (ejection amount control range) by the multiple pulse control is not assured.

3. If the offset drive is carried out with alternate printing between even and odd number nozzles, the liquid pressure wave influence is directly applied to the adjacent nozzle by the number of even and odd number nozzles.

4. In the offset drive between even and odd number nozzles, if the number of blocks is reduced in an attempt to assure sufficient PWM control width (for example, reducing 8 blocks to 4 blocks, the PWM control width is doubled), the step or line width change due to the deviation for respective blocks, change with the result of disturbance to the linearity of the vertical lines.

These are the problems.

SUMMARY OF THE INVENTION

Accordingly, it is a principal object of the present invention to provide an ink jet recording method and apparatus which has suppressed disturbance to the linearity.

It is another object of the present invention to provide an ink jet recording method and apparatus in which multi-nozzle and high frequency drive are simultaneously accomplished, and the influence of the liquid crosstalk is reduced.

According to an aspect of the present invention, there is provided an ink jet recording method using a number of ejection outlets for ejecting ink, comprising: grouping a number of ejection outlets into a plurality of groups such that ejection regions are partly overlapped; and supplying driving signals in such an order that ejection regions of groups of ejection outlets are partly overlapped.

According to another aspect of the present invention, there is provided an ink jet recording apparatus for effecting recording by ejecting ink through a number of ejection outlets, comprising: groups of ejection outlets, wherein ejection regions of groups are partly overlapped; supplying means for supplying driving signals in such an order that ejection regions of groups are partly overlapped.

According to the present invention, the liquid crosstalk control equivalent to the offset drive between even and odd number nozzles (reduction of the maximum refill retraction, and the increase of the refilling speed). In addition, since the drive signals are supplied at such timings that the ejection regions are partly overlapped, and therefore, the disturbance to the linearity can be reduced. Therefore, the recording speed can be increased without deteriorating the image quality.

BRIEF DESCRIPTION OF THE DRAWINGS

FIG. 12 illustrates an offset drive according to this invention.

FIG. 20 is a table of various data for the driving method of FIGS. 17–19.

FIG. 26 is a perspective view of a recording, that is, printing head according to Embodiment 3.

DESCRIPTION OF THE PREFERRED EMBODIMENTS

Referring to the accompanying drawings, the description will be made as to Embodiments of an ink jet recording method and apparatus according to this invention.

Embodiment 1

Monochromatic Printer, Fine Drive

In this embodiment, the present invention is applied to a monochromatic printer having a recording head with 128 (16×8) nozzles, with the head drive frequency fop=10.8 kHz. The description will be made as to a method for accomplishing this.

FIGS. 1–5, illustrate an ink jet unit IJU, an ink jet head IJH, an ink container IT, an ink jet cartridge IJC, a main assembly of an ink jet recording apparatus IJRA, a carriage HC, and interrelationship therebetween. Referring to these Figures, the description will be made as to these parts.

(i) Main assembly of the apparatus

Figure 1:
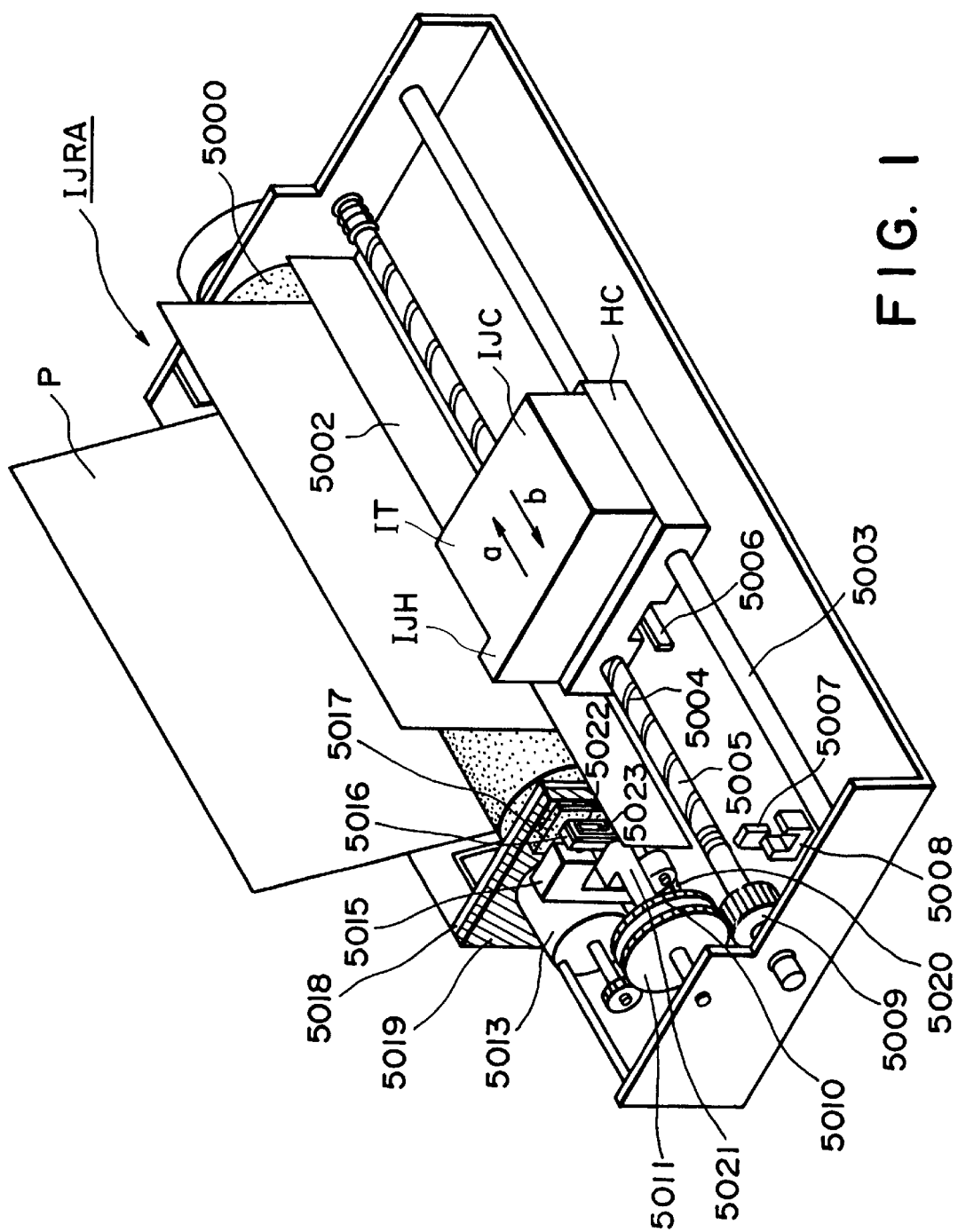
FIG. 1 is a schematic perspective view of an ink jet recording apparatus according to Embodiment 1 of the present invention.

FIG. 1 shows an outer appearance of an exemplary ink jet recording apparatus IJRA usable with the present invention. A lead screw 5005 is rotated through drive transmission gears 5011 and 5009 in response to forward and backward rotations of a driving motor 5013. The lead screw 5005 is provided with a helical group 5004, which is engaged with a pin (not shown) of a carriage HC. Therefore, the carriage HC is reciprocated in the directions of arrows a and b. An ink jet cartridge IJC is mounted on the carriage HC. Designated by a reference numeral 5002 is a sheet confining plate to press the sheet to a platen 5000 over a carriage moving range. A photocoupler constituted by elements 5007 and 5008 detects presence of a lever 5006 of the carriage, and in response to the detection, the rotating direction of the motor 5013 is switched. The photocoupler constitutes a home position detecting means. A supporting member 5016 supports a cap member 5022 for capping a front side of the recording head. A sucking means 5015 sucks the inside of the cap for effecting sucking recovery of the recording head through an opening 5023 in the cap. Designated by 5017 is a cleaning blade, and it is moved toward front and rear by a member 5019. They are supported on a frame 5018. The blade may be any other known cleaning blade.

A lever 5012 is used to start sucking of the sucking recovery operation, and is moved together with movement of a cam 5020 engaged with the carriage, and the driving force from the driving motor is controlled through known transmitting means such as a clutch or the like.

The capping, cleaning and sucking recovery operations are carried out at the position or positions faced to these means by the function of the lead screw 5005 when the carriage is in the region of the home position. This embodiment is not limited this, but may be used if the operations are carried out at known timings.

In the ink jet cartridge JIC of this embodiment, the ink accommodating portion has a relatively large ink containing portion, and an end portion of the ink jet unit IJU is slightly projected beyond the front surface of the ink container IT. The ink jet cartridge IJC is supported and fixed on the carriage HC in the main assembly of the ink jet recording apparatus IJRA by positioning means and electrical contacts, but is detachable from the carriage.

(ii) Ink jet unit IJU

The ink jet unit IJU effects the recording using electro-thermal transducers for generating thermal energy for producing film boiling of the ink in accordance with an electric signal.

(iii) Heater board

Figure 2:
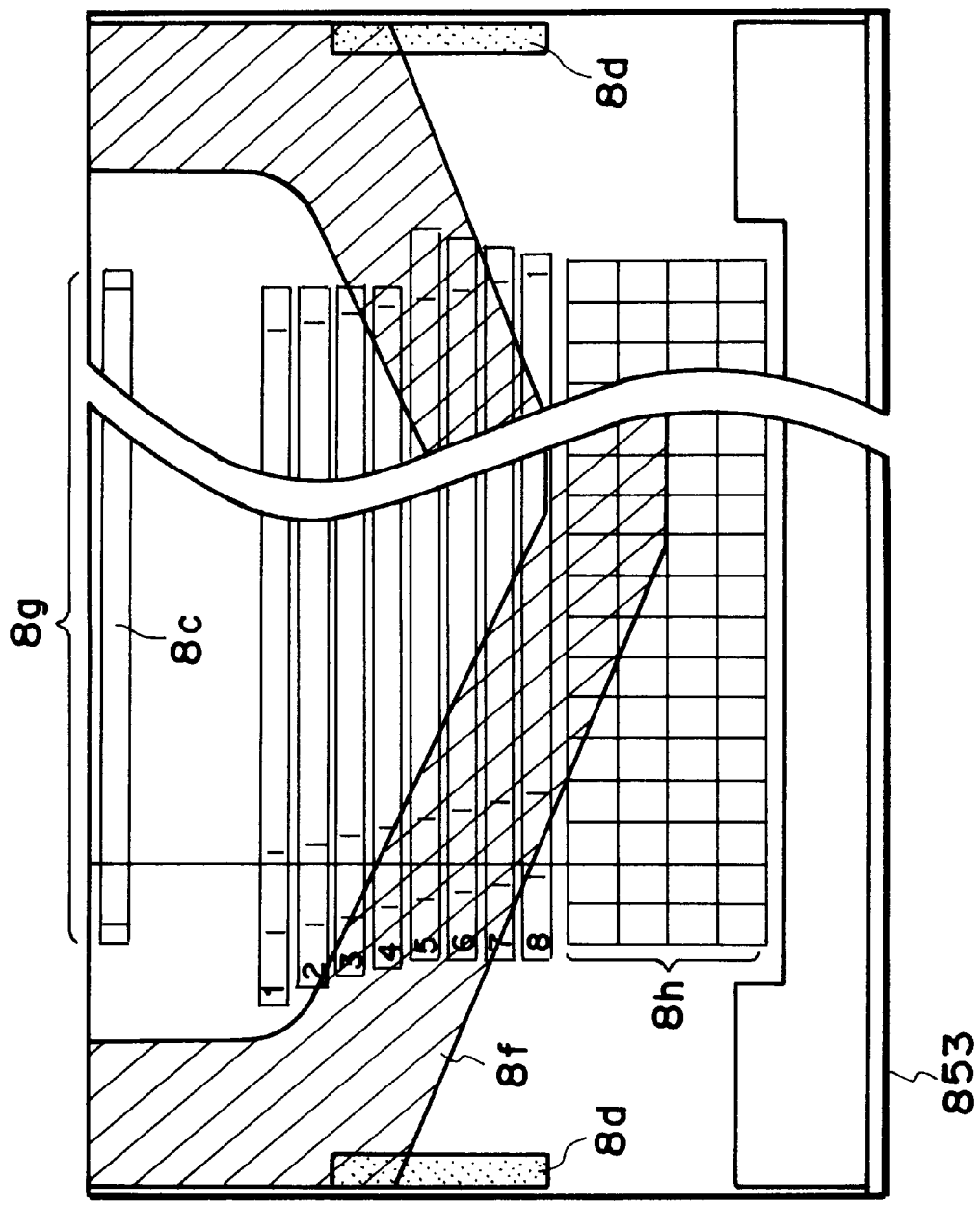
FIG. 2 is a schematic view of a heater board of a recording head used in Embodiment 1.

FIG. 2 is a schematic view of a heater board 100 of the recording head used in this embodiment. It comprises a substrate on which a (sub) heater 8d for controlling the temperature of the head, an array 8g of ejection parts having ejection (main) heaters 8c for ejecting the ink, and driving elements 8h are formed in the positional relationship shown in this Figure. By forming the various elements on the same substrate, the head temperature is efficiently detected and controlled, and in addition, the size of the head can be decreased, and the manufacturing steps can be simplified. The same figure shows a positional relationship of a cross-section 8f of an outer peripheral wall of the top plate for separation between a region filled with the ink and a region not filled with the ink. The ejection heater 8d side of the outer peripheral wall section 8f functions as a common liquid chamber. Liquid passages are formed by grooves formed on the array 8g of the surface 8f of the top plate.

(iv) Control system

Figure 3:
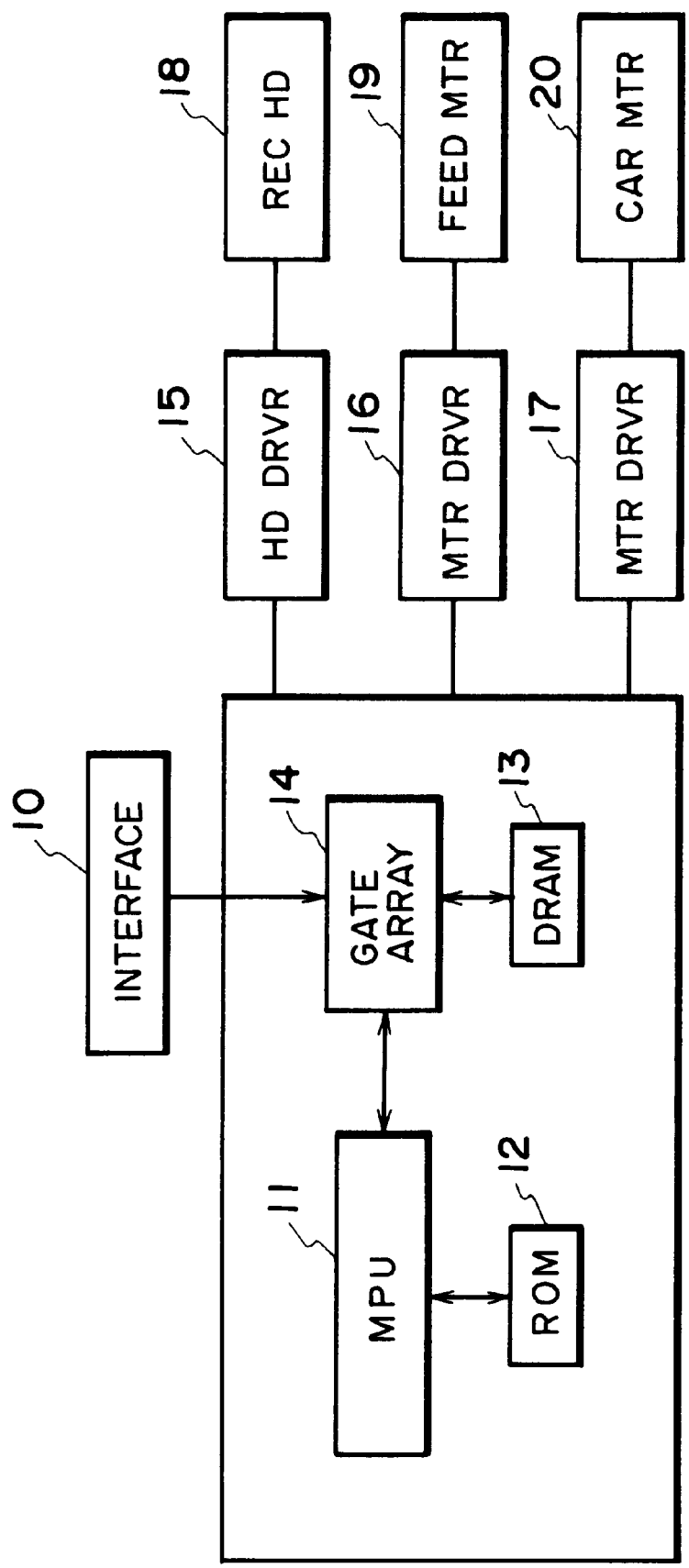
FIG. 3 is a block diagram of a control system used in Embodiment 1.

Referring to a block diagram of FIG. 3, the description will be made as to a control system for carrying out a recording control operation for various parts of the apparatus.

Upon supply of a print signal to an interface 100, the signal is converted to a signal for the printing between a gate array 104 and MPU 101, and a motor driver 106 or motor driver 107 are driven, so that the recording head is driven in accordance with the signal transmitted to the head driver 105.

Figure 4:
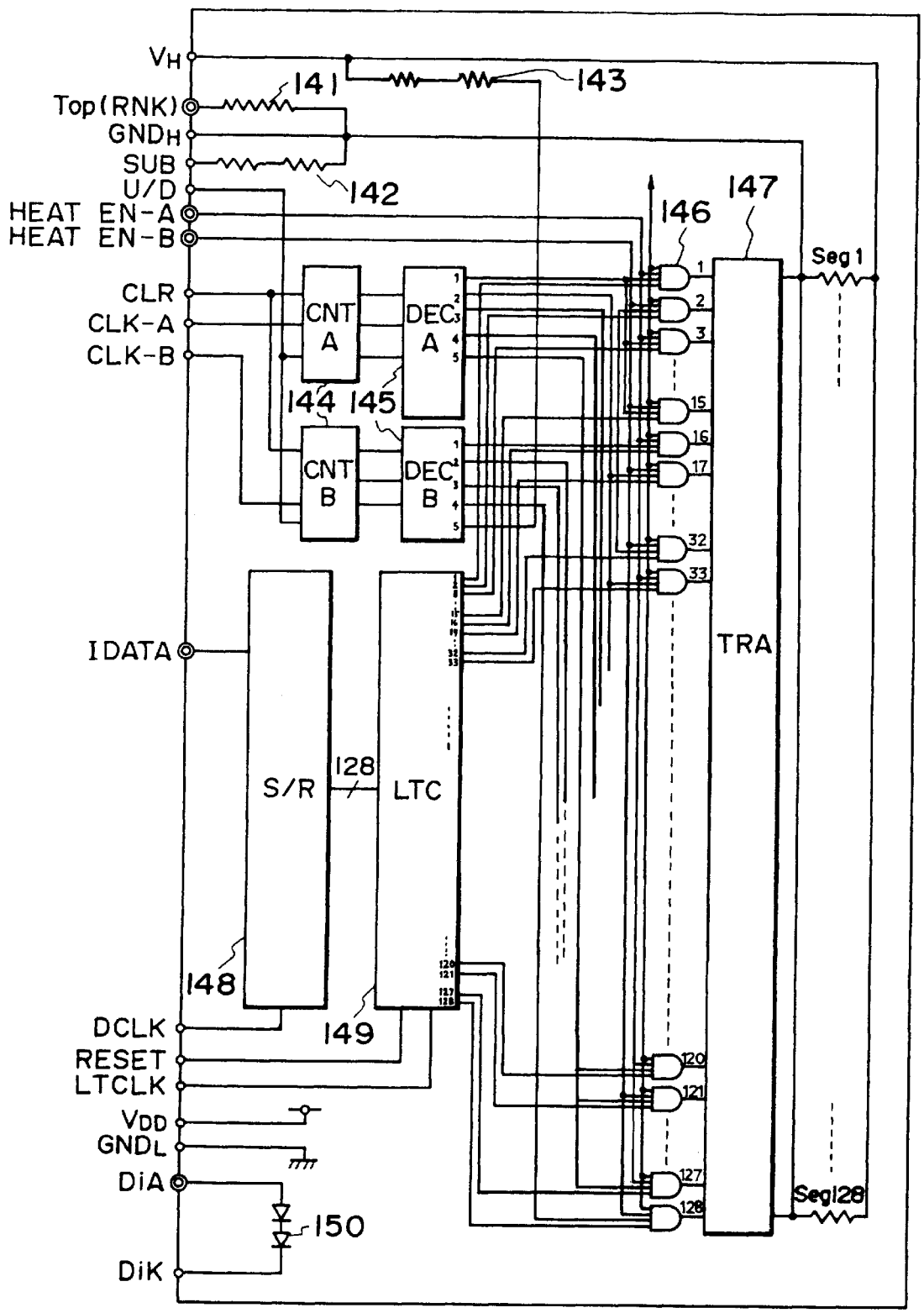
FIG. 4 is a block diagram of a driving circuit of Embodiment 1.

FIG. 4 is a block diagram of an example of a head driver in the gate array 104. One head has 128 nozzles and ejection heaters corresponding thereto. The ejection heaters are designated by seg 1–seg 128. A common electrode Vh is common to 128 ejection heaters. The common electrode Vh is supplied with a voltage of 20–35 V during recording operation. A terminal Top (Rnk) is used for discriminating a rank of the recording head. Depending on a resistance of a ranking resistance 141 therein, width, height or drive timing for the election heater drive pulse are corrected to provide uniform volumes of the ink droplet ejected from the recording head. A terminal GND is used to provide a reference voltage for a driving circuit for 128 ejection heaters. A terminal SUB is used for the sub-heater 142. The sub-heater 142 is used to raise the recording head temperature. The sub-heater 142 is provided at each of left and right end of the recording head.

Designated by HeatEN-A, heatEN-B are enabling signal terminals for ejection heater drive for blocks A and B, respectively. These terminals are independently controllable.

Designated by REST, CLK-A, CLK-R, U/D are terminals relating to a counter 144A and a counter 144B for selecting the nozzles for which data is set, for each block. There is provided a decoder 145 next to the counter 144, and further next thereto, a logic 146 for providing logic multiple with the recording signal, and is connected to the associated heater through a transistor array 147. The RESET is used to clear the counter 144. Clock terminals CLK-A and CLK-B are connected with counters 144A and 144B. A terminal U/D is used to select increment or decrement of the counter 144. During reciprocal recording operation, the counter is incremented in the forward stroke and is decremented in the backward stroke, thus alternating the counting up and down operations.

A terminal IDATA is a data input terminal, and the data is inputted in synchronism with the data clock signal from DCLK terminal, and the data are latched temporarily by 128 bit latching circuit through a 128 bit serial-parallel converter circuit 148. The RESET terminal functions also as a reset terminal for the latching circuit 149. A terminal LTCLK functions to supply a latch signal to the latching circuit 149.

A terminal VDD is an input terminal of the voltage from the voltage source for a logic system, it provides 5 V in this embodiment. A GNDL terminal functions to provide the logic system reference voltage. Between a terminal DiA and a terminal DiK, a series of two diodes, is connected. The diodes 150 are disposed at the left and right of the recording head, respectively to provide an average temperature of the recording head.

Figure 5:
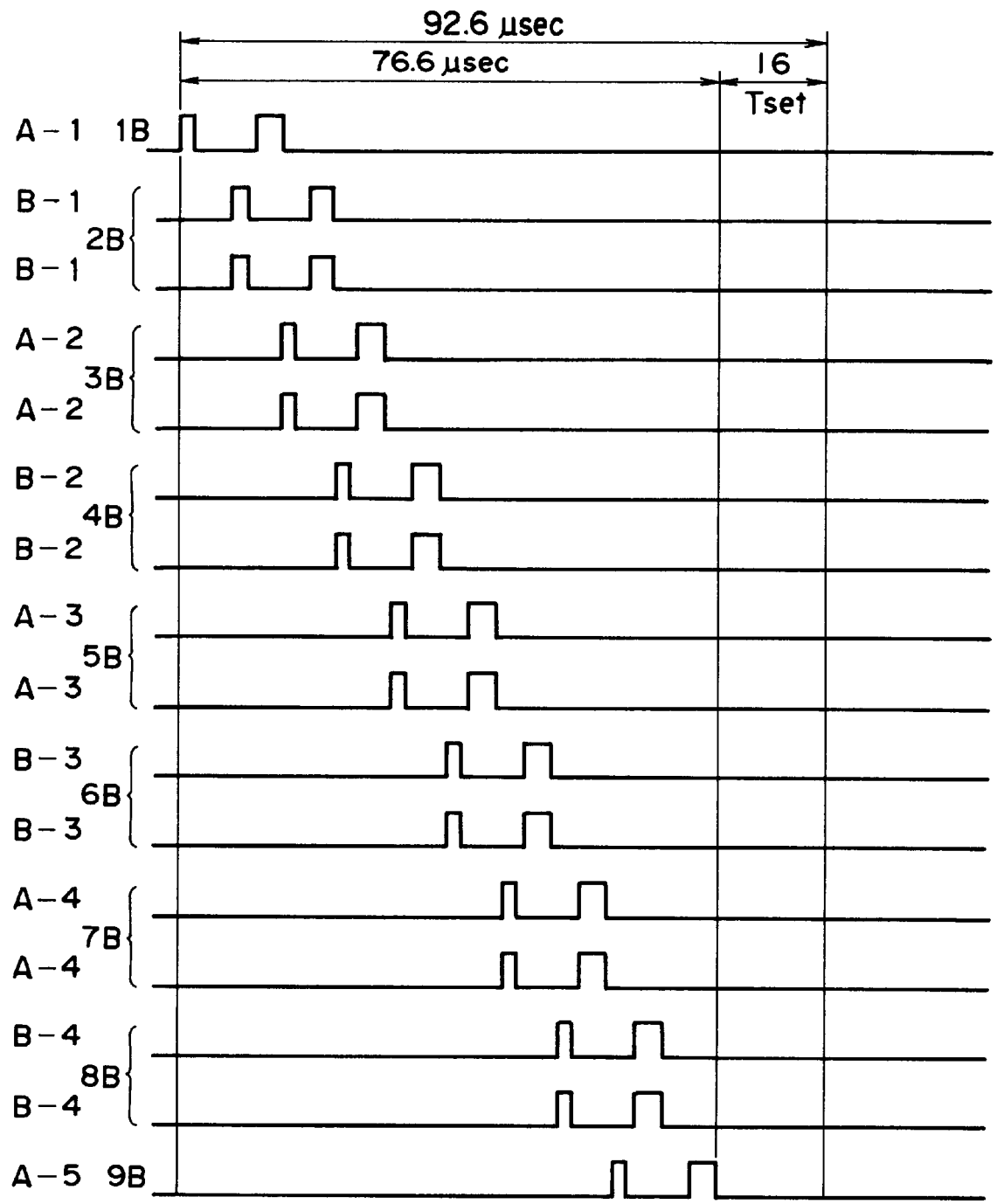
FIG. 5 is a timing chart 1 of a driving circuit used in Embodiment 1.
Figure 6:
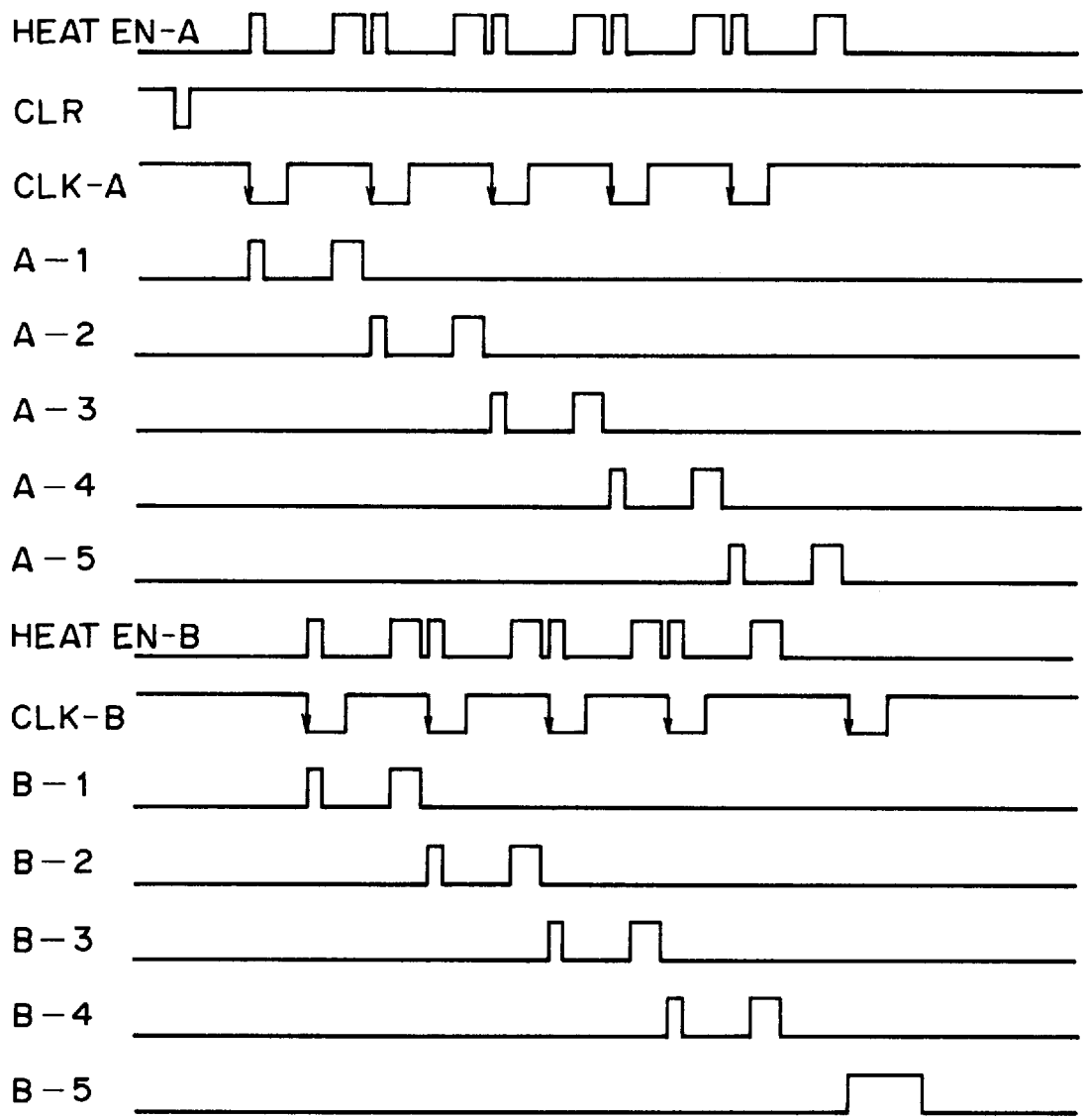
FIG. 6 is a timing chart 2 of a driving circuit in Embodiment 1.

FIG. 5 is a timing chart illustrating on-off timing of the ejection heaters of the driving block. FIG. 6 is a timing chart illustrating a timing of a counter.

Referring to FIG. 5, the present embodiment requires approx. 16 ($\mu$sec) to set and latch data. The total heating period is 76.6 ($\mu$sec). Therefore, 92.6 ($\mu$sec) is required in total. The drive frequency of the recording head is approx. 10.8 KHz.

In FIG. 6, HeatEN-A and HeatEN-B are signals which are independent from each other. The terminal RESET is common to the counter 144A and the counter 144B. First, RESET signal is supplied to clear the counter 144. At this time, U/D is set to increment, for example. When the clock pulses supplied from CLK-A in synchronism with HeatEN-A to CLK-A, one ejecting heating pulse is generated for block A-1. When data is in the nozzle corresponding to the block A-1, the ink is ejected by the pulse Subsequently, the block A-2, block A-3, block A4, block A-5 are driven, similarly. When a clock signal is supplied to CLK-B in synchronism with HeatEN-B from CLK-B, one ejecting heating pulse is generated for the block B-1, the timing of the heat pulse is such that it is not overlapped with on-period of the heat pulse for the block A. The timing will be described in detail hereinafter. Similarly, the operations continue to block B-4.

For block B-5, the heater 143 may be energized to generate a bubble in the common chamber of the recording head. The timing of the bubble generation, may be overlapped with the data setting period for the next record data. In this manner, the ejection heaters are driven for each of the blocks.

Figure 7:
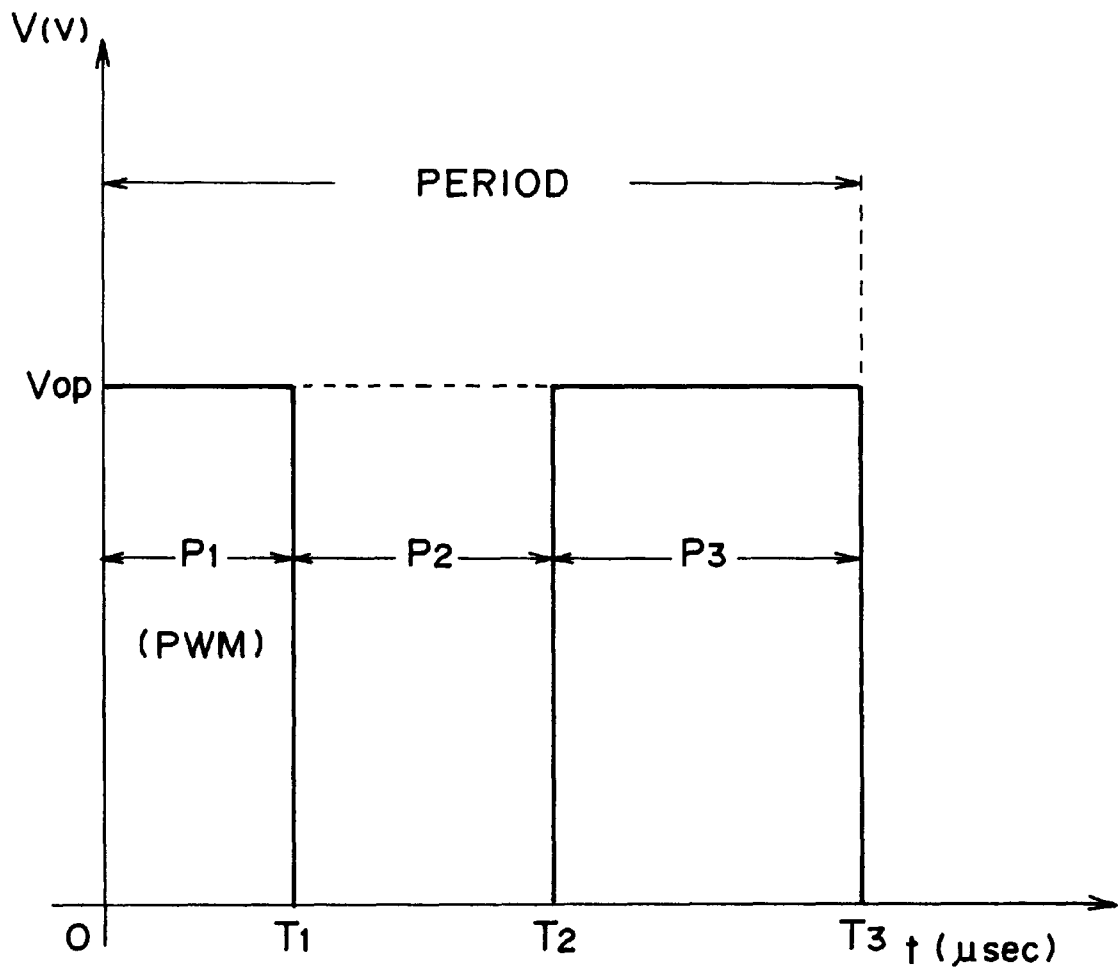
FIG. 7 shows a waveform of driving pulses for the recording head.

The description will be made as to ejection amount control method in this embodiment. Here, the method disclosed in U.S. Ser. No. 821,773 is used. For the ejection amount control, the head driving waveform is particularly used. The head drive uses divided pulses. As a typical pulse waveform, there is a double pulse waveform as shown in FIG. 7, wherein Vop is a drive voltage, P1 is a preheat pulse width, P2 is an interval timing (off-time), and P3 is a main heat pulse width. Designated by T1, T2 and T3 are time period for determining pulse widths P1, P2 and P3. Designated by Vop are electric energy required for generating thermal energy on the heater board HB, and is determined on the basis of an area, resistance, film structure of the heater board and/or the nozzle structure of the recording head.

In the divided pulse width modulation driving method used in this embodiment, the pulses are supplied in the order of P1, P2 and P3, wherein the pulse width P1 determines the pulse width before and during printing by head base temperature T1 (K, C, M, Y) which is represented by an output from a diode temperature sensor 150, so as to effect a PWM (pulse width modulation) control. The pulse width mainly controls the ink temperature distribution in the nozzle by the pre-heat pulse and is used for directly changing an ejection amount, so that the pulse width P1 is controlled in accordance with the head temperature. The control is such that pre-bubble-formation does not occur by too much heat applied to the heater board. Pulse width P2 corresponds to an interval time period and functions to provide a predetermined interval so as to prevent interference between the pre-heat pulse P1 and the main heat pulse P2 and also functions to control temperature distribution of the ink in the nozzle. The ejection amount can be controlled by the heat interval. The pulse width P3 of the main heat pulse is effective to create a bubble on the heater board to eject the ink droplet through an orifice. The pulse widths are determined on the basis of the area, the resistance, the film structure of the heater board and/or the nozzle structure or ink nature of the recording head.

Thus, if the head structure, the ink are determined, and the desired ejection amount Vd (p1/dot) is determined, the pulse widths P1, P2 and P3 may be properly determined by one skilled in the art. The number of combinations of the pulse widths P1, P2 and P3 for providing the same ejection amount is not limited to one. However, in consideration of the temperature dependency of the ejection amount which will be described hereinafter, the interval time P2 is as long as possible from the standpoint of expanding the controllable range of the ejection volume or quantity or amount, relative to the temperature change.

The description will be made as to the ejection amount control using the pre-heat pulse P1 (P2 is similarly usable).

Figure 8:
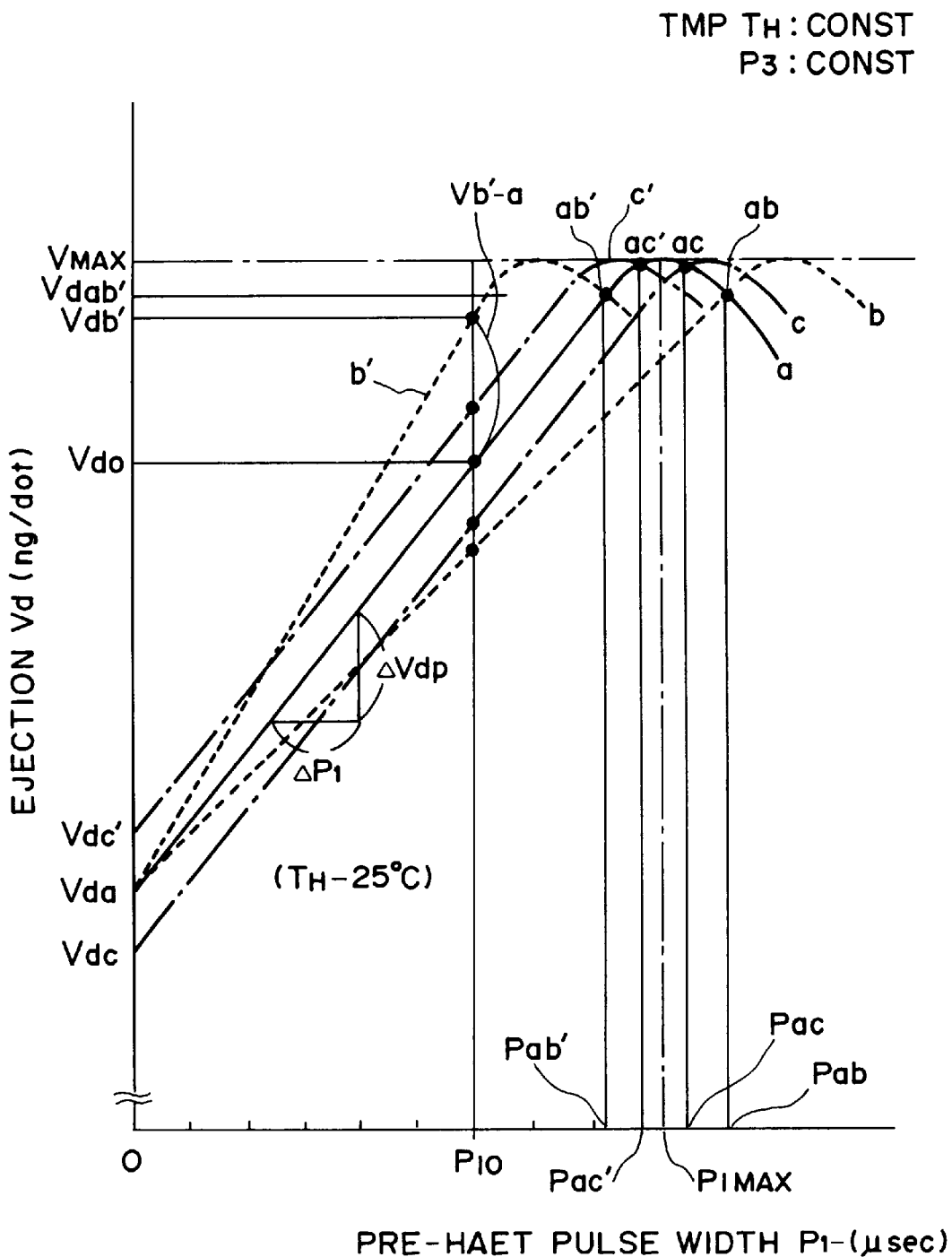
FIG. 8 shows a relationship between a pre-pulse P1 and an ejection amount Vd.
Figure 9:
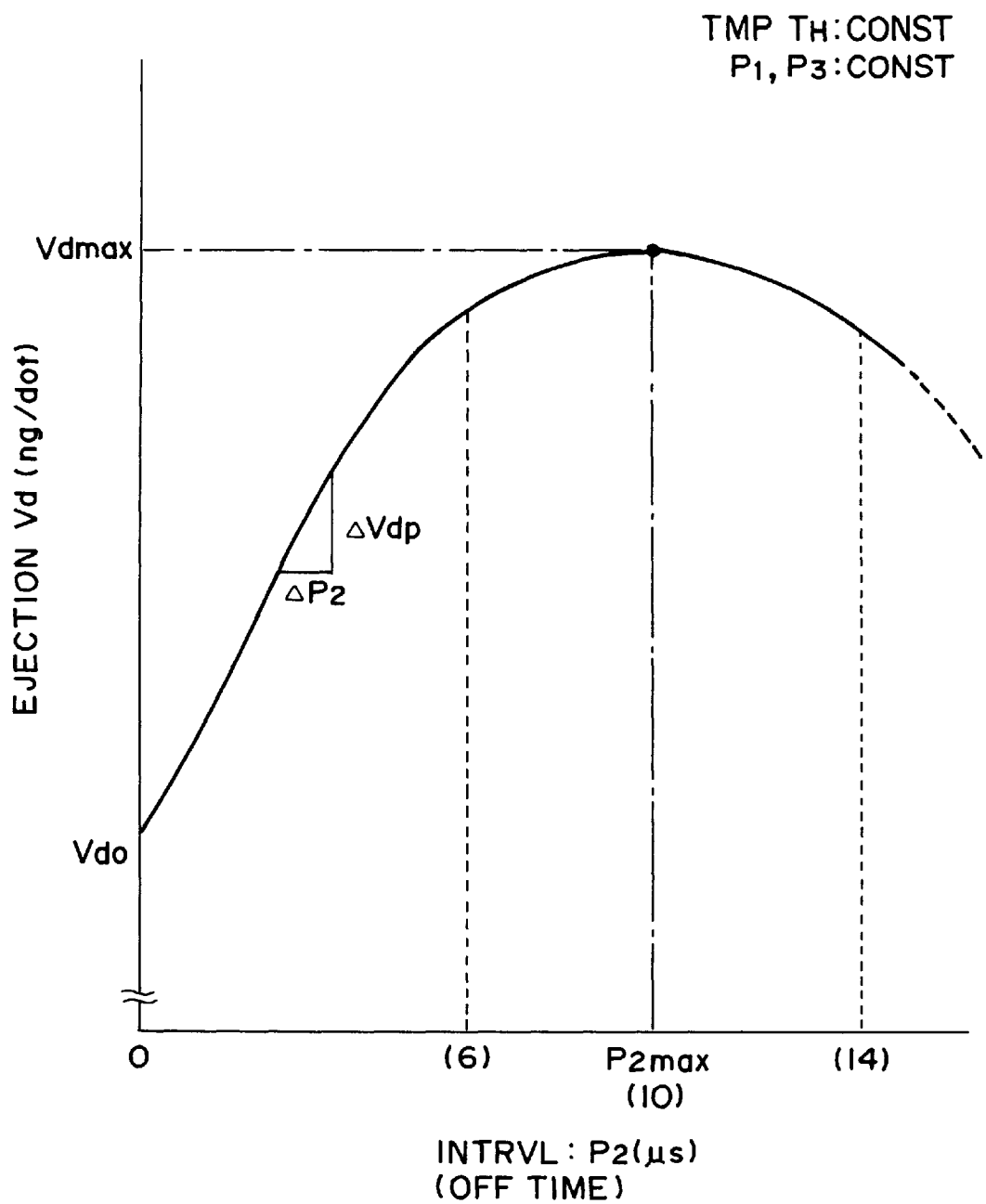
FIG. 9 shows a relationship between an interval P2 and an ejection amount Vd.

Under the condition of the constant head temperature (TH), the relationship between the pre-heat pulse P1 and the ejection amount VD is such that it linearly (or non-linearly) increases with increase of the pulse width P1 up to P1LMT, and thereafter, the bubble formation by the main heat pulse P3 is disturbed by the pre-bubble-formation, and the ejection amount reduces beyond P1MAX, as shown in FIG. 8, under the conditions of a constant head temperature (TH) and constant P1/P3, the relationship between the pre-heat pulse P2 and the ejection amount VD is such that the ejection amount decreases with increase of the pulse width P2 (main codes is decrease of the temperature) beyond P2MAX, as shown in FIG. 9. The investigations by the inventors, have revealed that P2MAX is ruled by thermal conductivity determined by head structure or the ink property or the like, and substantially a constant ejection amount can be provided in the range of approx. 10±4 ($\mu$sec).

Figure 10:
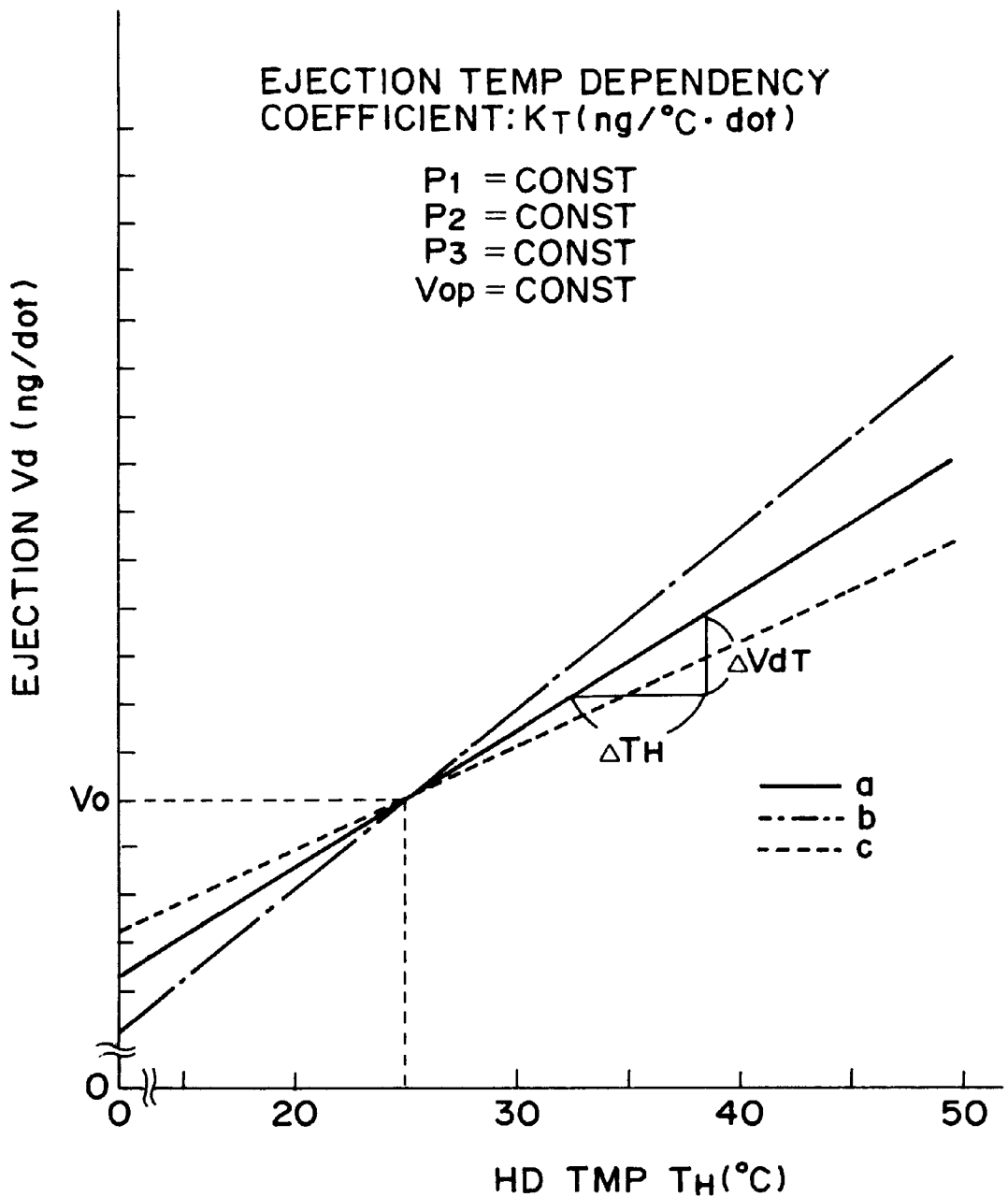
FIG. 10 shows a relationship between an ambient temperature and an ejection amount.
Figure 11:
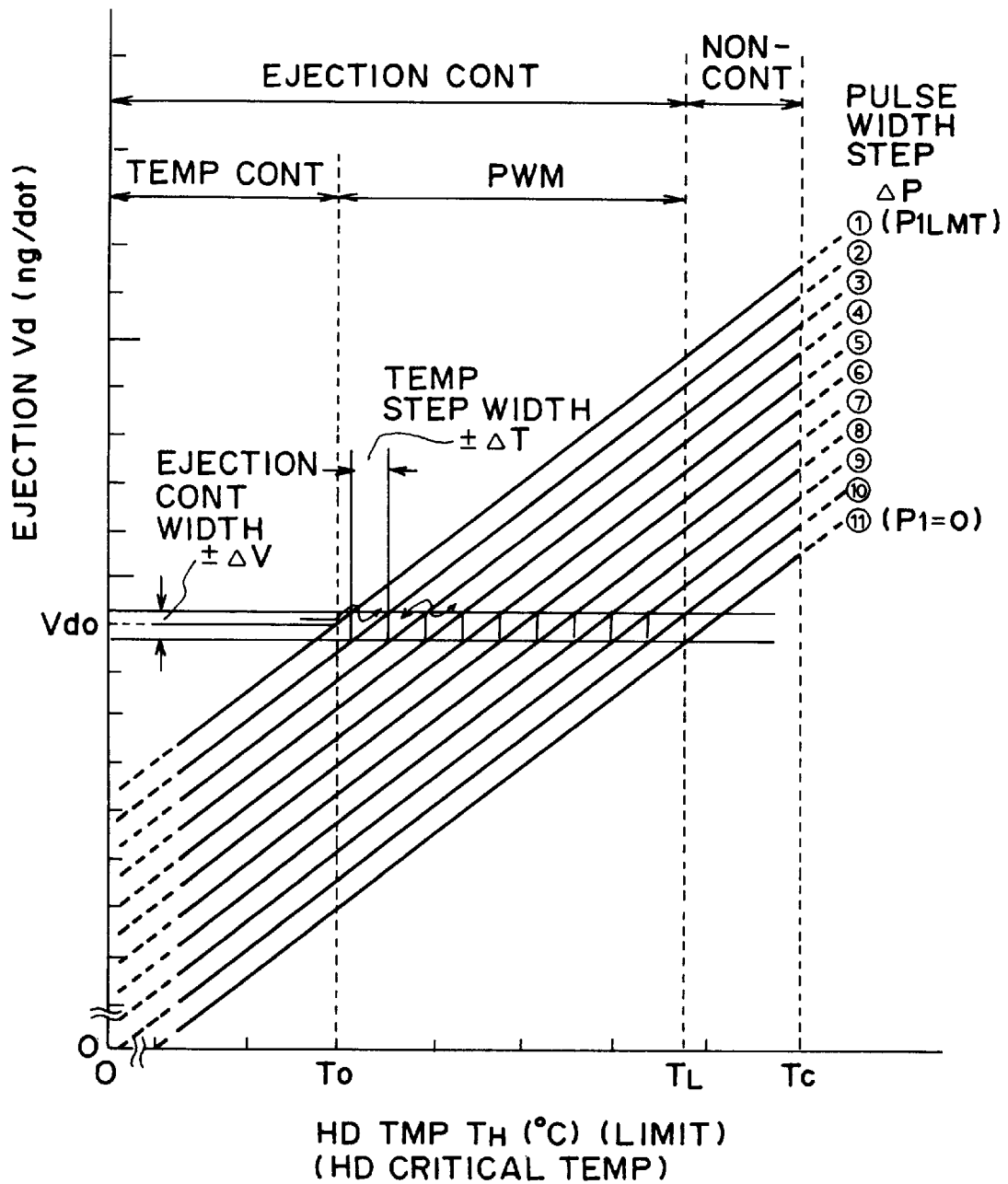
FIG. 11 shows an ejection amount control in this embodiment.

Under the constant pre-heat pulse P1, the relationship between the head temperature TH (ambient temperature) and ejection amount VD is such that it linearly increases with increase of the head temperature TH, as shown in FIG. 10. The coefficient in the linearity regions are the coefficient of the pre-heating pulse dependency of the ejection amount:

$$KP1=\Delta VDP/\Delta P1 \text{ (ng/}\mu\text{s}\cdot\text{dot)}$$

Coefficient of interval time dependency of the ejection amount:

$$KP2=\Delta VDP/\Delta P2 \text{ (ng/}\mu\text{s}\cdot\text{dot)}$$

Coefficient of the temperature dependency of the ejection amount:

$$KTH=\Delta VDP/\Delta TH \text{ (ng/}°\text{ C.}\cdot\text{dot)}$$

With the head structure used in this embodiment, the above coefficients are:

$$KPBk=8.25 \text{ (ng/}\mu\text{sec}\cdot\text{dot)}$$

$$KTHBk=0.7 \text{ (ng/}\mu\text{sec}\cdot\text{dot)}$$

By properly utilizing the relationship of the above two coefficients, more particularly, by effecting pulse width modulation control of the pulses P1 and P2 in accordance with the head temperature, the ejection amount can be maintained constant even if the head temperature changes due to ambient temperature and due to the self-temperature-rise by the printing action. In this manner, an ejection property control method (ejection amount and ejection speed) for maintaining the ink ejection amount for each color at a constant level is achieved.

As for the ejection property of the recording head using the above described driving method in which the respective colors are independently controlled, the optimum driving conditions are accomplished to stabilize the ink ejection under the conditions of the head temperature TH=25° C. and VOP=28 V, if P1=2.00 $\mu$sec, P2=9.0±3 $\mu$sec and P3=4.00 $\mu$sec. The ink ejection amount VD was 80.0 ng/dot, and the ejection speed V was 14.0 m/sec.

In this embodiment, the offset drive is carried out for the purpose of high speed drive of the recording head. The method and means will be described in detail as to the offset drive in this embodiment. For the purpose of simplicity of the explanation, 64 nozzles are divided into 8×8 groups.

FIG. 12A illustrates meniscus retraction when the ink is subjected to a great number of ejection reaction pressure waves shown in FIG. 12, and when it is not subjected to the reaction pressure wave, as shown in FIG. 12C. As will be understood, the maximum meniscus retraction is small when it is subjected to the ejection reaction pressure wave. From the fact that the refilling curve is steep, it will be understood that the refilling speed is also high.

The maximum meniscus retraction is normally determined by the design values of the impedance of the nozzle and the vacuum level in the common liquid chamber. However, if an instantaneous positive pressure wave toward the common liquid chamber produced as a reaction of ejection of the next timing ejection is imparted before the maximum meniscus retraction is reached, the meniscus which is retracted at a high speed by the inertia after the ejection reaction, is impacted by the pressure wave so that the maximum retraction position is reduced.

The refilling speed is determined normally by the design value of the impedance of the nozzle and the negative pressure level in the common liquid chamber. However, by imparting the positive pressure described above multiple times during refilling action, the refilling speed is increased.

In view of this, the meniscus retraction change with and without offset drive will be considered. FIGS. 13A and 13B show an example without the offset drive. In FIG. 13B, it will be understood that the maximum meniscus retraction and the refilling speed change gradually in the order of nozzle 1 of COM1, nozzle 9 of COM2, nozzle 17 of COM3 and nozzle 57 of COM8. The nozzle ejecting the ink at the timing COM1 receive the ejection reaction pressure waves of all of the subsequent ejections from the initial stage of the refilling action, and therefore, the refilling speed is highest. Toward the latter nozzles (COM2, COM3 and COM8), the number of ejection reaction pressure waves imparted to the initial stage of the refilling action, and therefore, the refilling speed decreases. As regards COM8, the maximum meniscus reaction is maximum with the result that a further longer refilling time is required. On the other hand, the offset drive of FIG. 14 is carried out in this embodiment. In this embodiment, the shifting is effected such that the timings of the segment signal SEC are determined to prevent simultaneously ejections of the adjacent nozzles. In addition, since the common signal COM is originally shifted, four nozzles are sequentially actuated from ejection heater H1 to the ejection heater H64 without actuating the adjacent nozzles. FIG. 14B shows the maximum meniscus retraction for the nozzles associated with each of the common signals. As will be understood from the Figure, the meniscus retraction distances for the nozzles driven by each of the common signals are uniform, as contrasted to the case without the offset drive. Particularly in the nozzles driven by the common signal COM8 (last drive), the meniscus retraction is within the tolerable range.

As described in the foregoing, the ink refilling into the nozzle is positively assisted by the offset drive in this embodiment, and therefore, the high speed recording is accomplished.

The description will be made as to a fine drive.

The following is combined:
1. multiple pulse application means for controlling ejection quantity (PWM control),
2. offset drive to reduce the fluid cross-talk,
3. effective use of the power source.

By the combination, high speed and high frequency multi-nozzle drive (fine drive) is accomplished.

Figure 15:
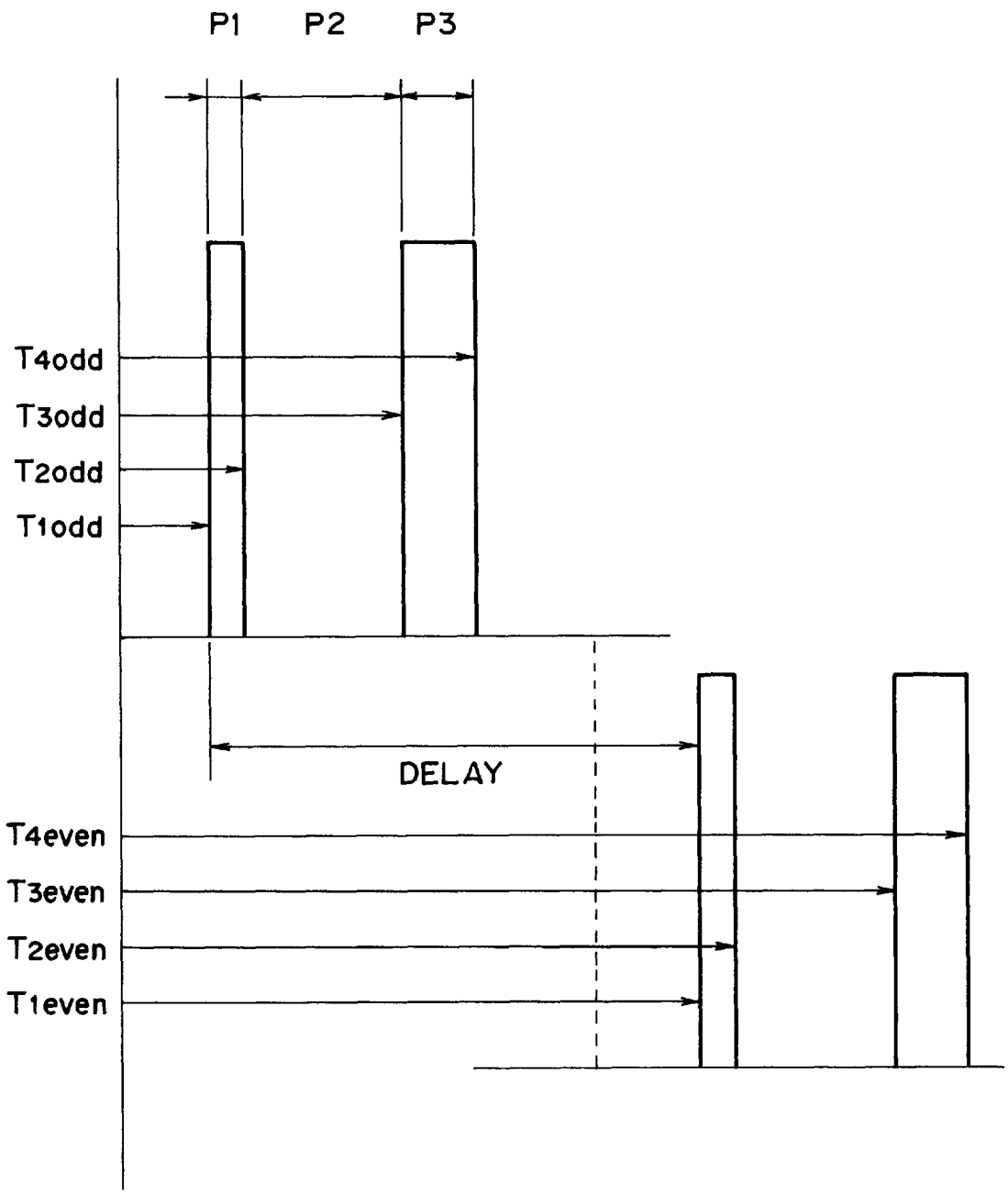
FIG. 15 shows a driving waveform used in a conventional offset driving.
Figure 16:
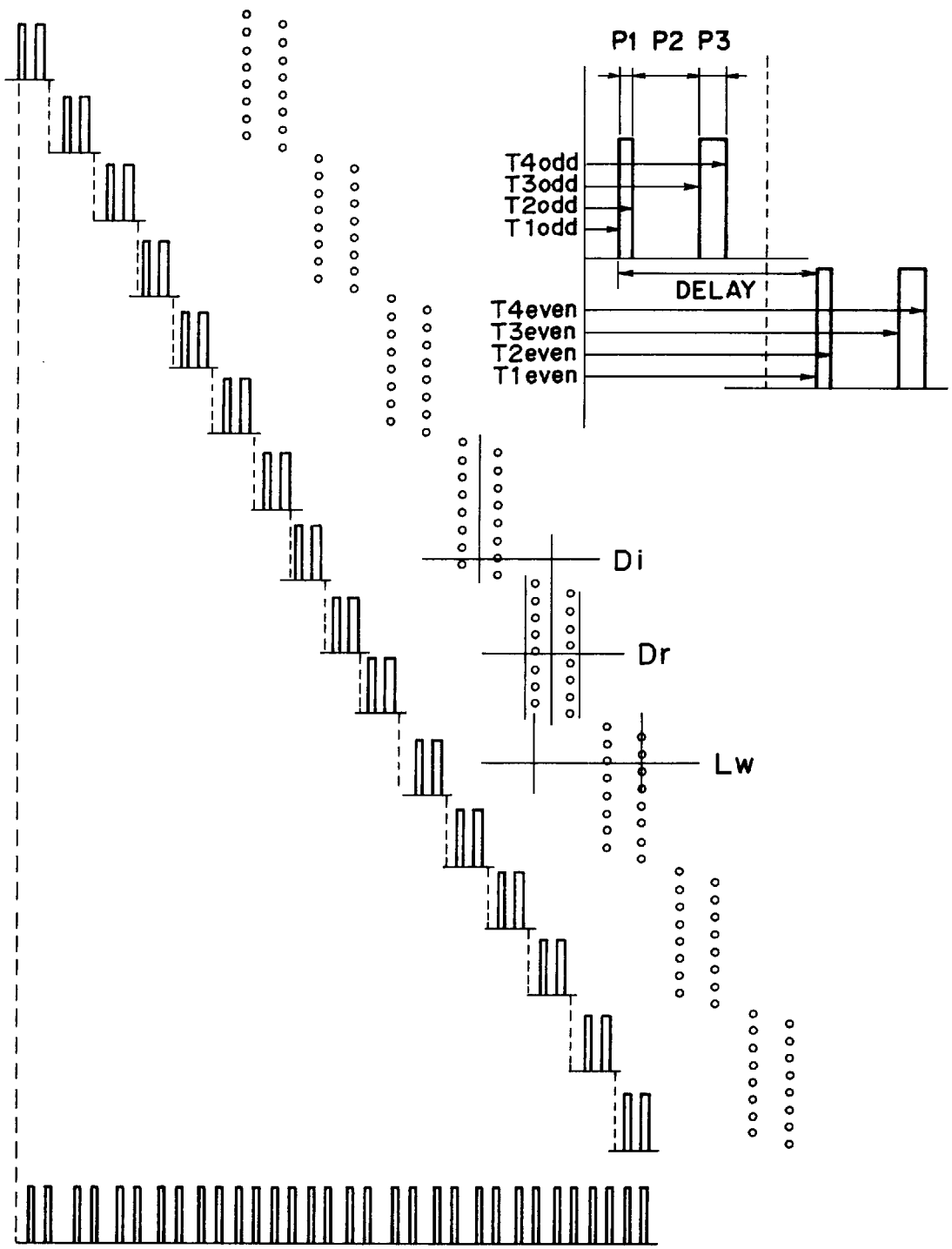
FIG. 16 illustrates a conventional offset drive.

When the above named offset control (2) in a usual manner, as shown in FIGS. 15 and 16, only after the ejection pulses (all of the plural pulses) for the nozzles in a certain block are completely finished, the ejection pulse waveform for the next block is outputted. In this case, it is difficult to assume the PWM control width; and the deviation of vertical lines attributable to deviation of the droplet shot position: and the linearity is disturbed; liquid cross-talk occurs.

Figure 17:
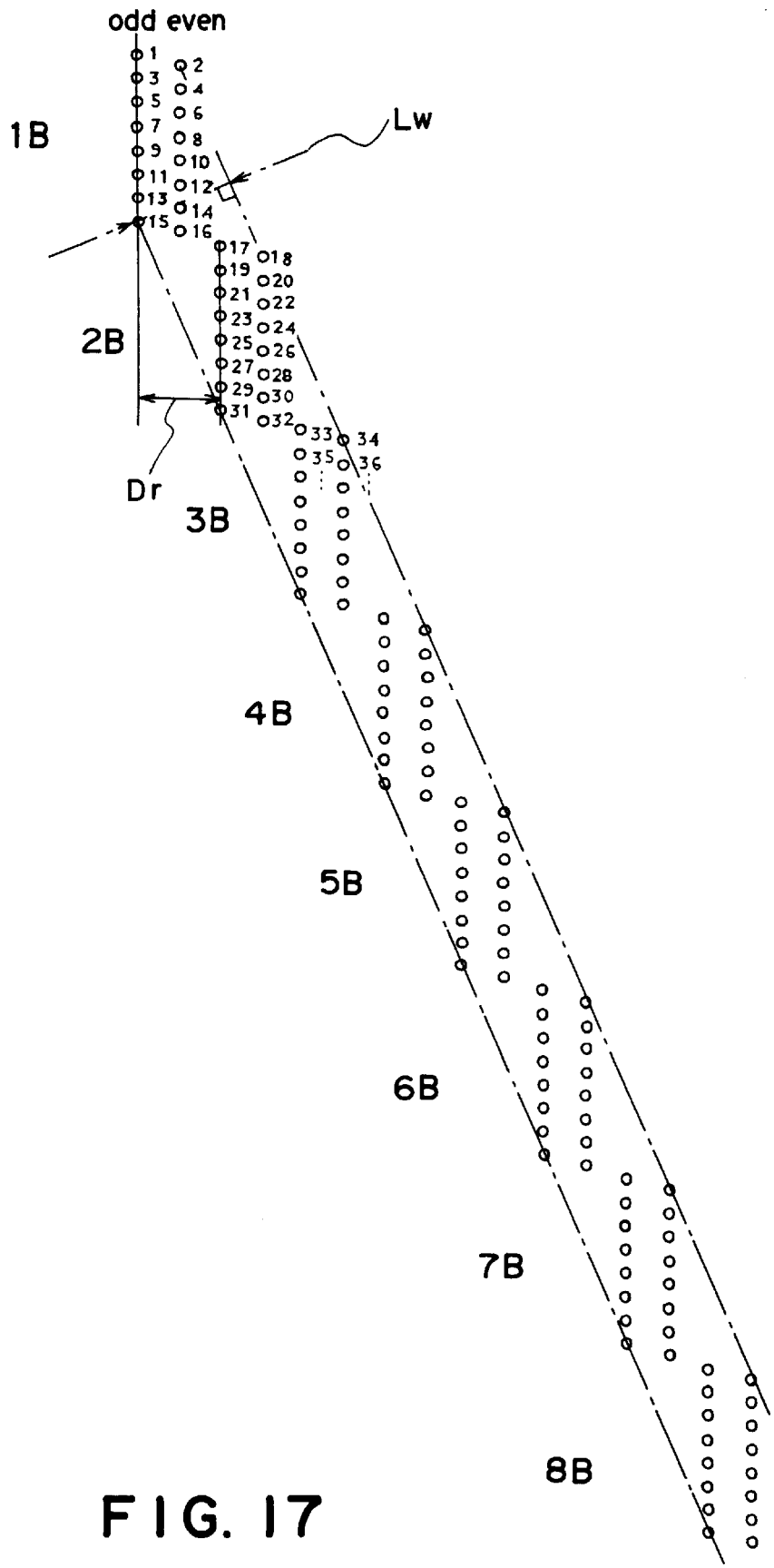
FIG. 17 illustrates printing by 8 block even-odd offset drive.
Figure 18:
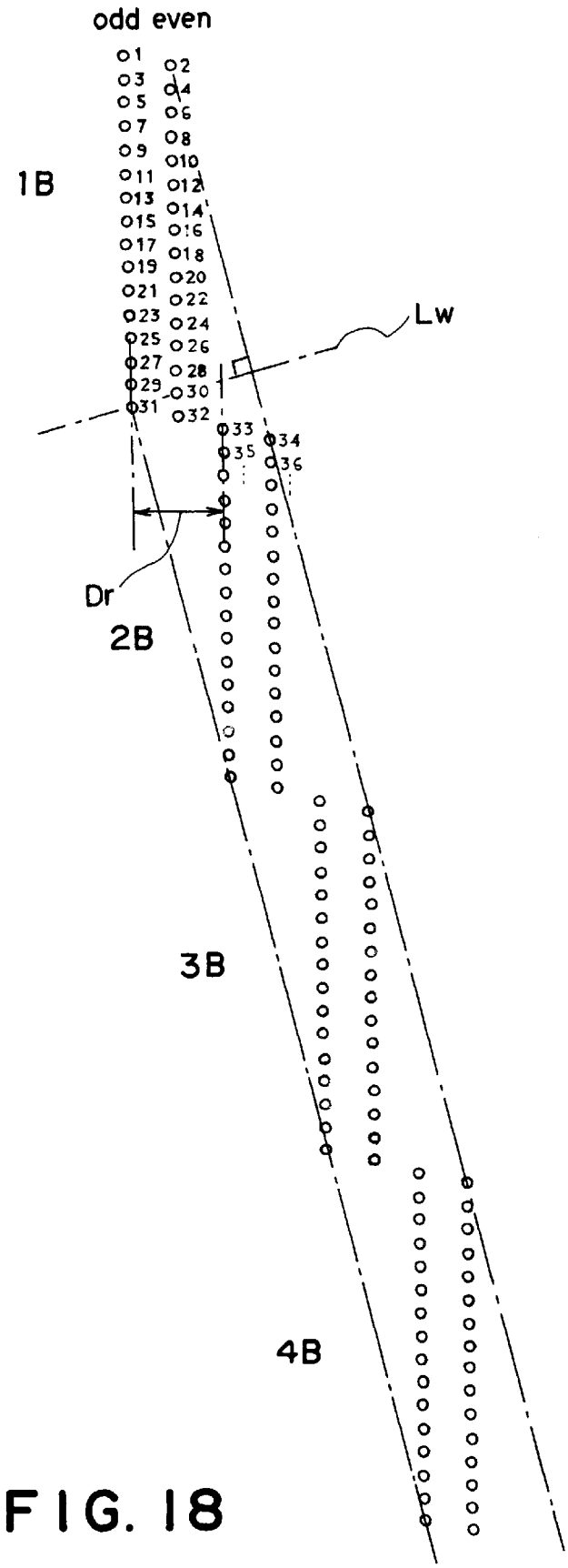
FIG. 18 illustrates printing by 4 block even-odd offset drive.
Figure 19:
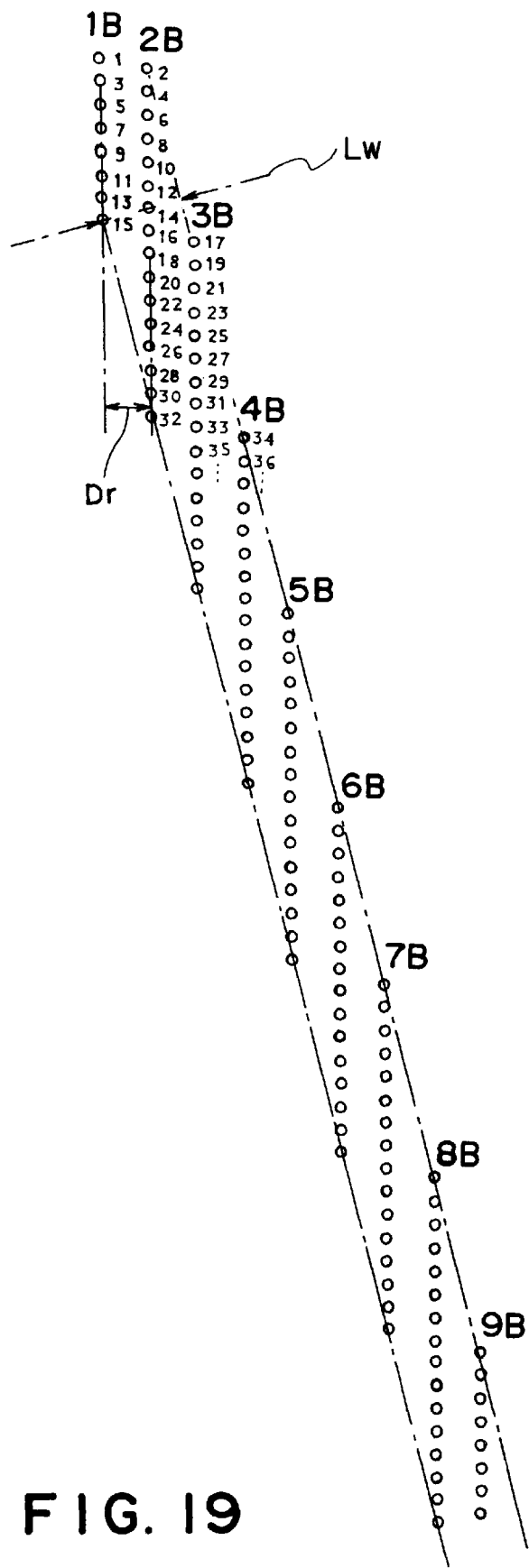
FIG. 19 illustrates printing by 9 block fine drive.

Referring to FIGS. 17, 18 and 19, the conventional drive, the drive of modification thereof, the PWM control width in a fine drive in this embodiment, the influence of the liquid crosstalk, the linearity will be briefly described. FIG. 17 illustrates 8 block even-odd offset drive; FIG. 18 illustrates 4 block even-odd offset drive; and FIG. 19 illustrates 9 block fine drive according to this Embodiment. In the Figure, Lw is a line width, Dr is a step. Here, the recording head has 128 nozzles, and is driven at a driving frequency of f=10.8 kHz at the resolution of 360 dpi. The carriage speed is approx. 762 mm/sec.

FIG. 20 shows data as a result of the respective driving systems. As will be understood from these Figures, the system of FIG. 17 does not involve the problem with the vertical lines, but the PWM control width required for one ejection can be only approx. 5.2 $\mu$sec with the result of difficulty in the stabilized control of the ejection amount. With the system of FIG. 18, the PWM control width is assured to be 10.4 $\mu$sec which is sufficient. However, the deviation of vertical line due to the step is conspicuous. In addition, since the segments are alternately activated for even and odd number nozzles, the liquid crosstalk is such that the nozzles adjacent to every 16 nozzles are directly influenced. With the system of FIG. 19, the PWM control width (approx. 9.3 $\mu$sec), the liquid crosstalk (8 nozzles are directly influenced by adjacent nozzles), the vertical line deviation, are properly compromised, and therefore, this is preferable.

Figure 21:
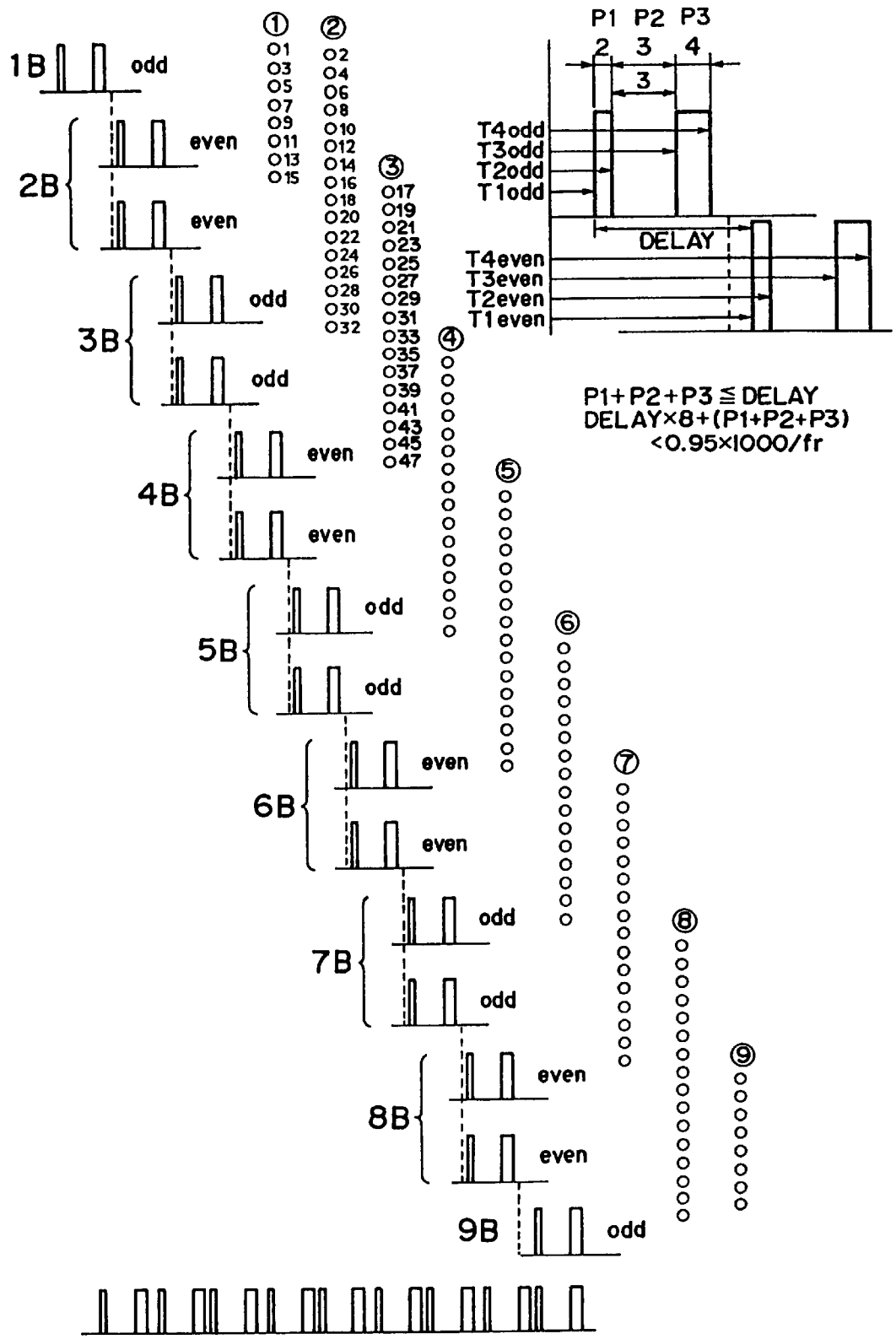
FIG. 21 shows a waveform illustrating fine drive method used in Embodiment 1.

The description will be made as to the actual drive in this embodiment. Here, the reference will be made to FIG. 21 for the easy understanding of the drive shown in FIG. 5. As shown in FIG. 21, the number of blocks is increased by one, and the respective blocks are divided into even number nozzles and odd number nozzles. After one half 8 nozzles (odd number nozzles) of the first block is actuated for ejection (since a hypothetical block is used, only one half nozzles can be actuated for ejection), and thereafter, 16 nozzles (even number nozzles) of the second block are actuated for ejection. Here, the first block and the second block are separated to partial nozzle arrays (ejection parts) so that the ejection regions are partly overlapped. At this time, the number of adjacent nozzles strongly influenced by the liquid crosstalk can be made 8 which is the same as with conventional 64 nozzles.

Therefore, the open period of one block TBL can be maximized, and the total pulse width between blocks Pop= P1+P2+P3 can be assured, and also the offset period Tdelay is assured.

In the following, the fine drive method for 128 nozzles with drive frequency f=10.8 (KHz), will be described.

The drive pulse waveform for even number and odd number nozzles, has Vop=28 V, P1=2 $\mu$sec, P2=3 $\mu$sec and P3=4 $\mu$sec.

First, 8 odd number segments 1, 3, 5, 7, 9, 11, 13 and 15 of the first block are simultaneously driven by double pulses.

Subsequently, 16 even number segments 2, 4, 6, 8, 10, 12, 14, 16, 18, 20, 22, 24, 26, 28 and 32 of the second block are simultaneously driven in the manner that the double pulse drive of the even number nozzles of the second block is effected after the double pulse drive for the odd number nozzles in the first block. At this time, the pulse P12Bodd is delayed by approx. 9 μsec from P11Beven.

Subsequently, 16 odd number segments 9, 11, 13, 15, 17, 19, 21, 23, 25, 27, 29, 31, 33, 35, 37, 39, 41, 43, 45 and 47 of the third block are simultaneously driven in the manner that the double pulse drive for the odd number nozzles in the third block is effected after the double pulse drive for the even number nozzles for the second block. At this time, there exists a delay of approx. 9 μsec between the pulse P13Beven and P12Bodd.

Subsequently, similarly, 16 even number segments 34, 36, 38, 40, 42, 44, 46, 48, 50, 52, 54, 56, 58, 60, 62 and 64 of the fourth block are simultaneously driven.

In the similar manner, the odd number nozzles to No. 9 block are subjected to the fine drive, by which approx. 9 μsec of the pulse open period (Tblock=P1+P2+P3) for each column is assured, and in addition, approx. 10.8 KHz drive is possible even if 128 nozzles are divided into 9 blocks, and they are subjected to the even-odd offset drive with offset time of approx. 9 μsec.

The control parameters following:

$$P1+P2+P3 < \text{Tdelay (offset time)} < P2$$

$$\text{Tdelay} \times 8 + (P1+P2+P3) < 0.95 \times 1000/fop$$

P1: pre-heat pulse width
P2: interval time (off time)
P3: main heat pulse width
Tdelay: offset time
fop: drive frequency In order to avoid overlapping between the pulses P1 and P3 by the offset time (T delay), the first inequality is satisfied. The second inequality is satisfied by which the length of the pulse train is shorter than the drive period. In the second equation, the coefficient 0.95 is used in consideration of the margin for the delay or the like of the pulse (approx. 1 μsec in FIG. 21). Generally the coefficient is 0.9–0.95. The pre-heat pulse width is changed in the range of 0–P1.

Figure 22:
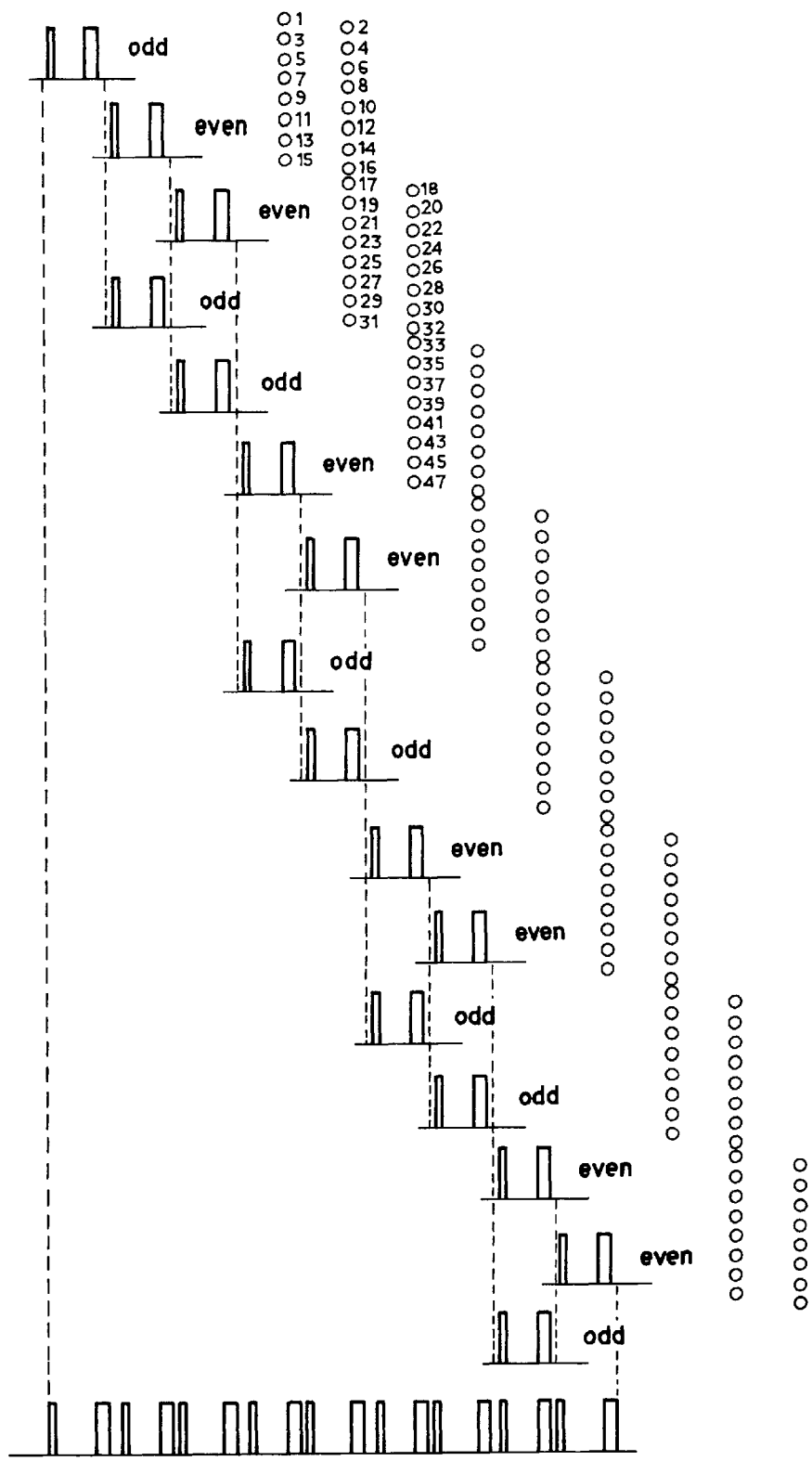
FIG. 22 illustrates another fine drive method usable with Embodiment 1.

The drive may be effected without change between even number and odd number nozzles in the same block, as shown in FIG. 22.

As described in the foregoing, by the drive control means for alternating the advantageous effect and the disadvantageous effect of the driving means, the improper image recording resulting from the offset drive can be suppressed, thus accomplishing the nigh speed refilling action, and therefore, high speed and high quality image recording are possible.

In addition, since the ejection regions of the nozzles constituting the blocks are partly overlapped, the disturbance to the linearity can be reduced.

The drive of FIG. 5 corresponding to FIG. 21 will be described.

In FIG. 5, after the first pulse waveform of plural pulses for the first block is completed, there is an interval time period prior to when the second pulse waveform is supplied. During the interval period, the first pulse waveform for the second block is applied, and then, the second pulse waveform for the first block is supplied, and at the last stage, the second pulse waveform is supplied for the second block. Thus, the interlacing is effected so that the plural pulses are not overlapped, and the total pulse width Pop=P1+P2+P3 is assured, and the offset time (Tdelay) is assured.

In the following, the fine interlace drive method for 128 nozzles with drive frequency f=10.8 (KHz), will be described, in conjunction with FIG. 5.

The drive pulse waveform for even number and odd number nozzles, has Vop=28 V, P1=2 μsec, P2=9 μsec and P3=4 μsec. Here, the number of the block is 9 (usual 8 plus 1).

First, 8 odd number segments 1, 3, 5, 7, 9, 11, 13 and 15 of the first block are simultaneously driven by double pulses.

Subsequently, 16 even number segments 2, 4, 6, 8, 10, 12, 14, 16, 18, 20, 22, 24, 26, 28, 30 and 32 of the second block are simultaneously driven in the manner that the pulse P12Beven of the double pulse drive of the even number nozzles of the second block is interposed between the pulse P11Bodd of the double pulse drive for the odd number nozzles in the first block and P31Bodd. At this time, the pulse P12Beven is delayed by approx. 8 μsec from P11Bodd.

Subsequently, 16 odd number segments 17, 19, 21, 23, 25, 27, 29, 31, 33, 35, 37, 39, 41, 43, 45 and 47 of the third block are simultaneously driven in the manner that the pulse P12Bodd of the double pulse drive for the odd number nozzles in the third block is interposed between the pulse P12Beven and the pulse P32Beven. At this time, there exists a delay of approx. 8 μsec between the pulse P11Bodd and P12Beven.

Subsequently, similarly, 16 even number segments 34, 363, 38, 40, 42, 44, 46, 48, 50, 52, 54, 56, 58, 60, 62 and 64 of the fourth block are simultaneously driven.

In the similar manner, to the even number nozzles of No. 9 block are subjected to the interlace drive, by which approx. 15 μsec of the pulse open period (Tblock=P1+P2+P3) for each column is assured, and in addition, approx. 10.8 KHz drive is possible even if 128 nozzles are divided into 8 blocks, and they are subjected to the even-odd offset drive with offset time of approx. 8 μsec, similarly to FIG. 21.

In order to avoid the overlapping between pulses to assure the interlace, the control parameters satisfy the following:

$$P1+P3 < \text{Tdelay (offset time)} < P2$$

$$\text{Tdelay} \times 15 + (P1+P2+P3) < 0.9 \times 1000/fop$$

P1: pre-heat pulse width
P2: interval time (off time)
P3: main heat pulse width
Tdelay: offset time
fop: drive frequency As described in the foregoing, by the drive control means for alternating the advantageous effect and the disadvantageous effect of the driving means, the improper image recording resulting from the offset drive can be suppressed, thus accomplishing the high speed refilling action, and therefore, high speed and high quality image recording are possible.

Embodiment 2

Color Printer (Four Colors) Fine Drive

Figure 23:
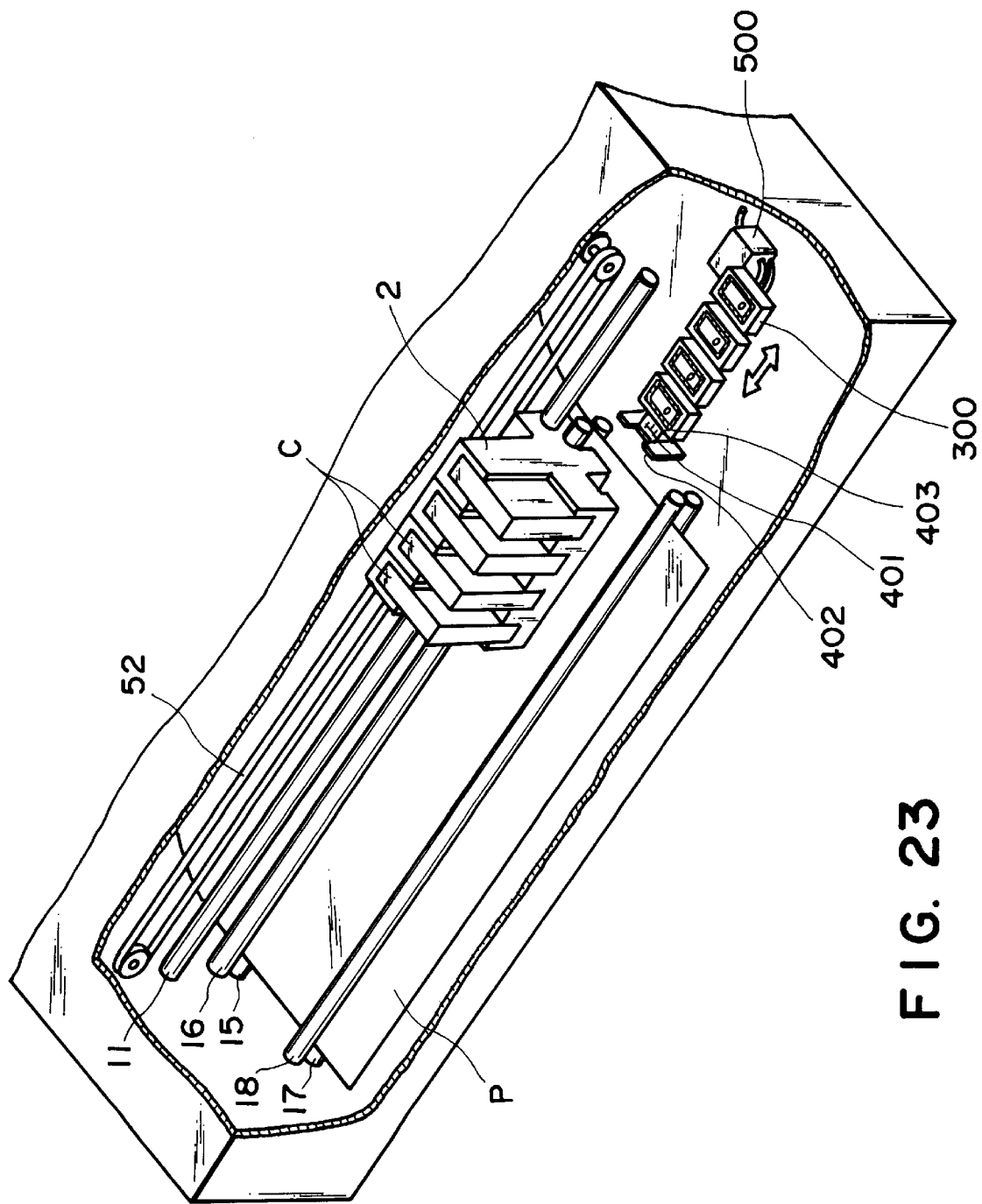
FIG. 23 is a perspective view of a color ink jet apparatus according to Embodiment 2 of this invention.

FIG. 23 is a perspective view of a color ink jet recording apparatus employing the driving method of this invention.

The apparatus is provided with exchangeable black (BK), cyan (C), magenta (M), yellow (Y) color recording heads. It is a full-color serial printer. The recording head has a resolution of 360 dpi, a drive frequency of 10.8 kHz, and is provided with 128 ejection outlets (nozzles).

In this embodiment, designated by C is a recording head cartridge having integral four recording heads for black, cyan, magenta and yellow colors. It comprises a recording head and an integral ink container for supplying the ink thereto. The recording head cartridge C is detachably mounted on a carriage by an unshown mounting structure. The carriage 2 is slidably engaged with the guiding shaft 11. It is also connected with a driving belt 52 driven by an unshown main scan motor. By this, the recording head cartridge C is movable for the scanning movement along the guiding shaft 11. Feeding rollers 15, 16 and 17, 18 are extended substantially parallel to the guiding shaft 11 at the front and rear portions of the recording region covered by the scanning of the recording head cartridge C. The feeding rollers 15, 16 and 17, 18 are driven by an unshown sub-scan motor to feed the recording material P. The recording material P constitutes a recording surface faced to the ejection side surface of the recording head cartridge C.

A recovery unit is provided faced to a movable range of the cartridge C, adjacent the recording region of the recording head cartridge C. The recovery unit is provided with a capping unit 30 provided corresponding to the plurality of recording heads of the cartridge C. With the movement of the carriage 2, it is slidable to the left and right, and is movable vertically. When the carriage 2 is at the home position, it is joined with the recording head to cap unit. In the recovery unit, designated by reference numerals 401 and 402 are first and second blade as wiping members; 403, a blade cleaner of a liquid absorbing material for example to clean the first blade 401.

A pump unit 500 is provided to suck the ink or the like from the ejection outlets and the neighborhood thereof of the recording heads through the cap unit 300.

Figure 24:
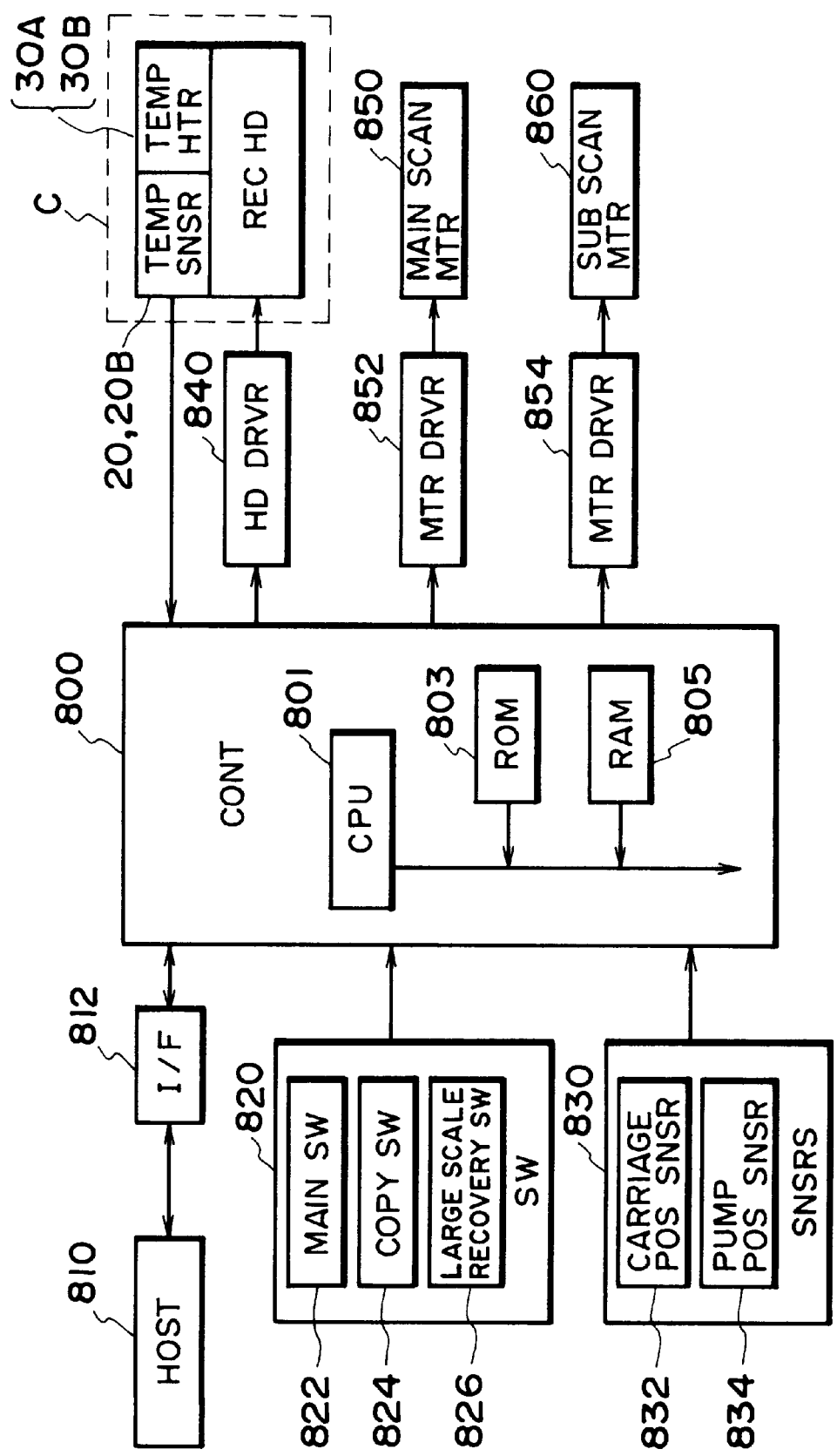
FIG. 24 is a block diagram of a control circuit according to Embodiment 2 of the present invention.

FIG. 24 is a block diagram of a control system for the color ink jet recording apparatus.

A main controller 800 comprises a CPU 801 in the form of a microcomputer for example, for executing various sequential control, ROM803 for storing a program and a table corresponding to the sequential operations and other necessary values, a host apparatus for supplying image data (which may be an image reader). Image data, command signals, status signals or the like are transferred to the controller 800 through an interface (I/F) 812. Switches 820 includes a main switch 822, record start instruction switch 824 and recovery switch 826 for instructing start of recovery operation. They are operable by an operator. Sensors 830 include a sensor 832 for sensing the home position, start position or the like of the carriage 2, and sensors 834 including a leaf switch 530 for detecting pump position.

A head driver 840 functions to drive electrothermal transducers of the recording head in accordance with the image data. A part of the head drivers is used for driving heaters 30A and 30B. The outputs of the temperature sensors 20A and 20B are supplied to the controller 800. A main scan motor 850 is used for moving the carriage 2 in the main scan direction, and designated by 852 is a driver therefor. A sub-scan motor 860 function to feed the recording material.

In the following, the fine drive method for 128 nozzles with drive frequency f=10.8 (KHz), will be described, referring to FIG. 25.

The drive pulse waveform for even number and odd number nozzles, has Vop=28 V, P1=2 $\mu$sec, P2=3 $\mu$sec and P3=4 $\mu$sec. Nine blocks are driven (one is added).

First, 8 even number segments 2, 4, 6, 8, 10, 12, 14 and 16 of the first block are simultaneously driven by double pulses.

Subsequently, 14 odd number segments 1, 3, 5, 7, 9, 11, 13, 15, 17, 19, 21, 23, 25, 27, 29 and 31 of the second block are simultaneously driven in the manner that the double pulse drive of the odd number nozzles of the second block is effected after the double pulse drive for the even number nozzles in the first block. At this time, the pulse P12Beven is delayed by approx. 9 $\mu$sec from P11Bodd.

Subsequently, 16 even number segments 18, 20, 22, 24, 26, 28, 30, 32, 34, 36, 38, 40, 42, 44, 46 and 48 of the third block are simultaneously driven in the manner that the the double pulse drive for the even number nozzles in the third block is effected after the double pulse drive for the odd number nozzles of the second block. At this time, there exists a delay of approx. 8 $\mu$sec between the pulse P13Bodd and P12Beven.

In the similar manner, to the odd number nozzles of No. 9 block are subjected to the fine drive, by which approx. 9 $\mu$sec of the pulse open period (Tblock=P1+P2+P3) for each column is assured, and in addition, approx. 10.8 KHz drive is possible even if 128 nozzles are divided into 9 blocks, and they are subjected to the even-odd offset drive with offset time of approx. 9 $\mu$sec.

The above described conditions are satisfied, the phases of the odd and even number pulses are deviated to avoid simultaneous ejections.

As described in the foregoing, by the drive control means for alternating the advantageous effect and the disadvantageous effect of the driving means, the improper image recording resulting from the offset drive can be suppressed, thus accomplishing the high speed refilling action, and therefore, high speed and high quality image recording are possible.

In addition, the ejection periods of the nozzles constituting the blocks, are partly overlapped, so that the disturbance to the linearity can be reduced.

Embodiment 3

Multi-level (Density) Printing (Including Fine Drive)

The color ink jet apparatus of this embodiment is a modification of the apparatus used in Embodiment 2. More particularly, the head cartridge unit and the ink container unit are replaced with a multi-level density head (three level recording using two dye densities). The above-described interlace drive and the even-odd fine alternate drive, are used, by which high quality printing is accomplished. The number of nozzles of the multi-level density head is 32 nozzle (4×8)×4 colors (space between colors=8 nozzle×3), that is, 152 nozzles in total. The head is divided into 9 blocks. The resolution of the head is 360 dpi. The number of heads is two, and comprises optimized different density inks (two inks for each color, that is, 8 in total). The drive frequency for the recording head is 10.8 kHz.

In this embodiment, the dye densities of the inks are BK-light is 1.0%, BK-dark is 3.5%, C-light is 0.7%, C-dark is 2.5%, M-light is 0.6%, M-dark is 2.5%, Y-light is 0.7%, and Y-dark is 2.0%. They are recorded for one pixel in the order of dark and light.

FIG. 26 shown the structure of the heads The recording head 201 is capable of printing four colors (BK, C, M and Y) by a single head. The numbers of the nozzles 211 for each color is 32 for BK, 32 for C, 32 for M and 32 for Y. A connecting portion 202 is used for connection with a supply port 203 of the ink container 204, and the ink is supplied to the recording head through a passage 215. The recording head 201 is mounted on the carriage 220, using the base plate 213. The carriage 220 moves along a guiding shaft 221. The temperature sensor is in the form of a diode sensor, and is disposed at each side of the nozzles and between BK and C (3 in total). The diode sensors monitor an average temperature of the recording head (base temperature TB). The temperature adjacent the nozzles for each color is counted from a dot count for each color provided in the main assembly so that temperatures are independently predicted and controlled.

The description will be made as to the fine alternate drive.

Figure 27:
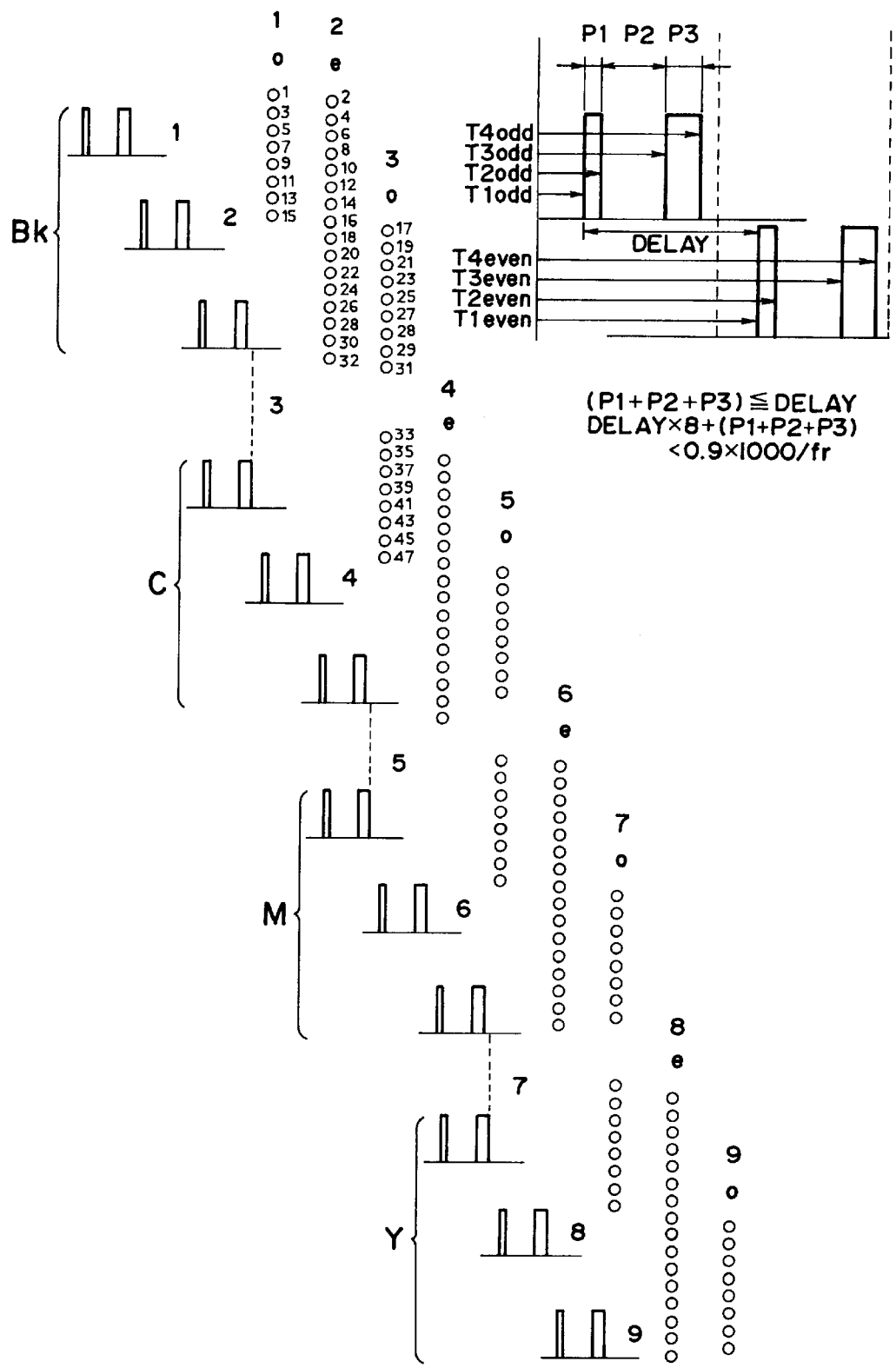
FIG. 27 shows a drive waveform illustrating the order of head drive in Embodiment 3.
Figure 28:
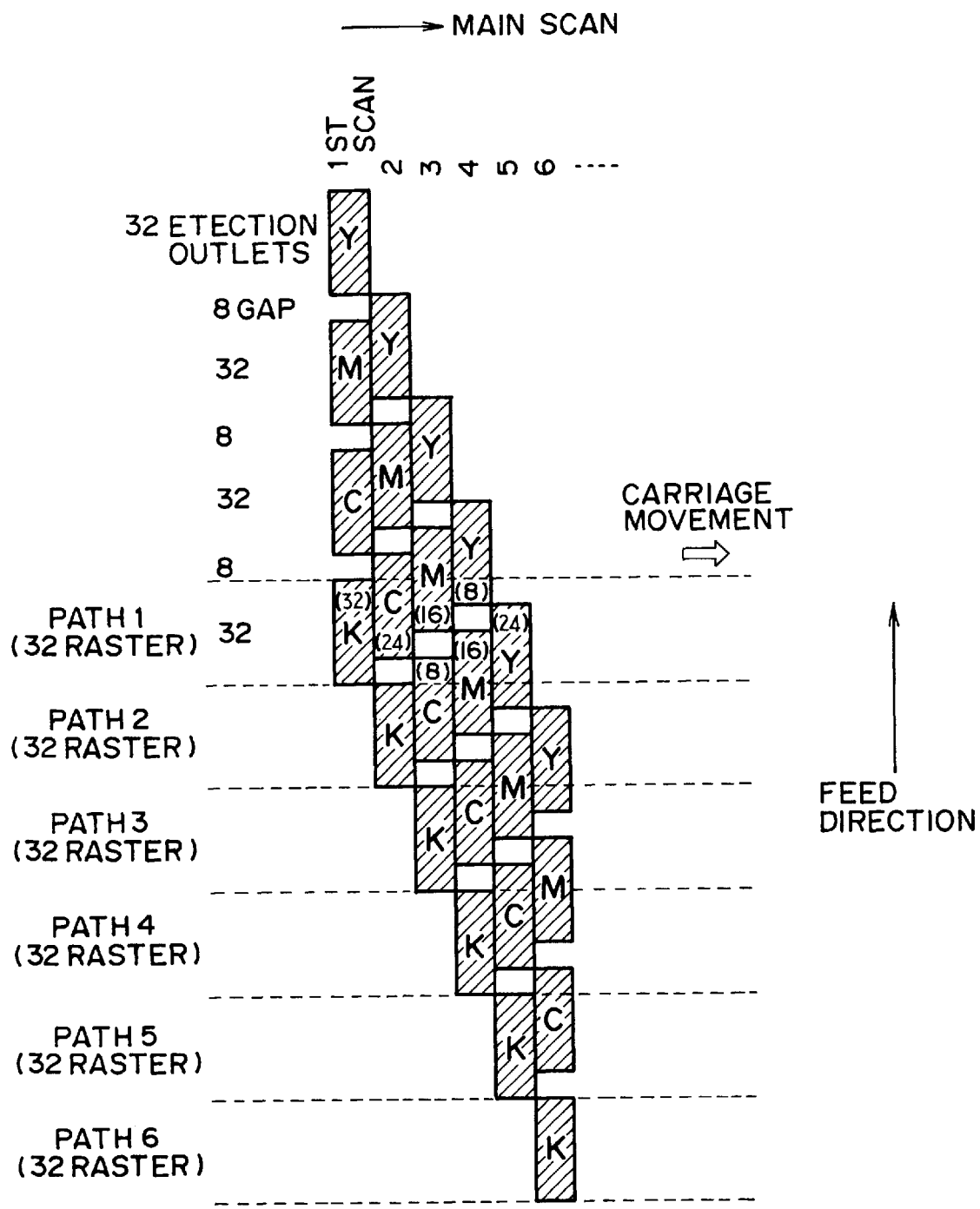
FIG. 28 illustrates recording operation in Embodiment 3.

As shown in FIG. 27, for the dark and light head drive, the nozzles are grouped into 3 blocks each containing 32 black nozzles, 3 blocks each containing 32 cyan nozzles, 3 blocks each containing magenta 32 nozzles, and 3 blocks each containing yellow 32 nozzles. Since for 8 nozzles between colors (24 nozzles, 2 block in total), there is no time difference, and therefore, they are driven as a unit containing 9 blocks.

First, 8 odd number segments 1, 3, 5, 7, 9, 11, 13 and 15 of the first black block are simultaneously driven by double pulses. Subsequently, 16 even number segments 2, 4, 6, 8, 10, 12, 14, 16, 18, 20, 22, 24, 26, 28, 30 and 32 of the second block are simultaneously driven in the manner that the double pulse drive of the even number nozzles of the second block comes after the double pulse drive for the odd number nozzles in the first block. At this time, the pulse P12Beven is delayed by approx. 9 μsec from P11Bodd.

Subsequently, 16 odd number segments 17, 19, 21, 23, 25, 27, 29, 31, 33(1C), 35(3C), 37(5C), 39(7C), 41(9C), 43(11C), 45(13C) and 47(15C) of the third block are simultaneously driven as if black and cyan blocks are one block, in the manner that the double pulse drive for the odd number nozzles in the third block comes after the double pulse drive for even number nozzles of the second block. At this time, there exists a delay of approx. 9 μsec between the pulse P13Bodd and P12Beven. In this manner, cyan first–third blocks are driven as if they are black third–fifth blocks.

Subsequently, similarly, 16 even number segments 34(2C), 36(4C), 38(6C), 40(8C), 42(10C), 44(12C), 46(14C), 48(16C), 50(18C), 52(20C), 54(22C), 56(24C), 58(26C), 60(28C), 62(30C) and 64(32C) of the fourth block are simultaneously driven.

Subsequently, as for the fifth block, cyan and magenta blocks are deemed as one block, and 16 odd number nozzles 49(17C), 51(19C), 53(21C), 55(23C), 57(25C), 59(27C), 61(29C), 63(31C), 65(1M), 67(3M), 69(5M), 71(7M), 73(9M), 75(11M), 77(13M) and 79(15M), are simultaneously driven in the manner that the double pulse drive for the odd number nozzles of the fifth block comes after the double pulse drive for the even number of the cyan fourth block. Between P15Bodd and P14Beven, approx. 9 μsec delay can be assumed.

In the similar manner, each of 3 blocks for magenta and yellow colors are deemed as black blocks, so that interlace fine alternate sequential drive on the basis of 9 blocks, is accomplished.

In this manner, first–ninth block are sequentially driven for black to yellow colors. Block intervals TBL (open period for one ejection) is approx. 9 μsec.

Figure 25:
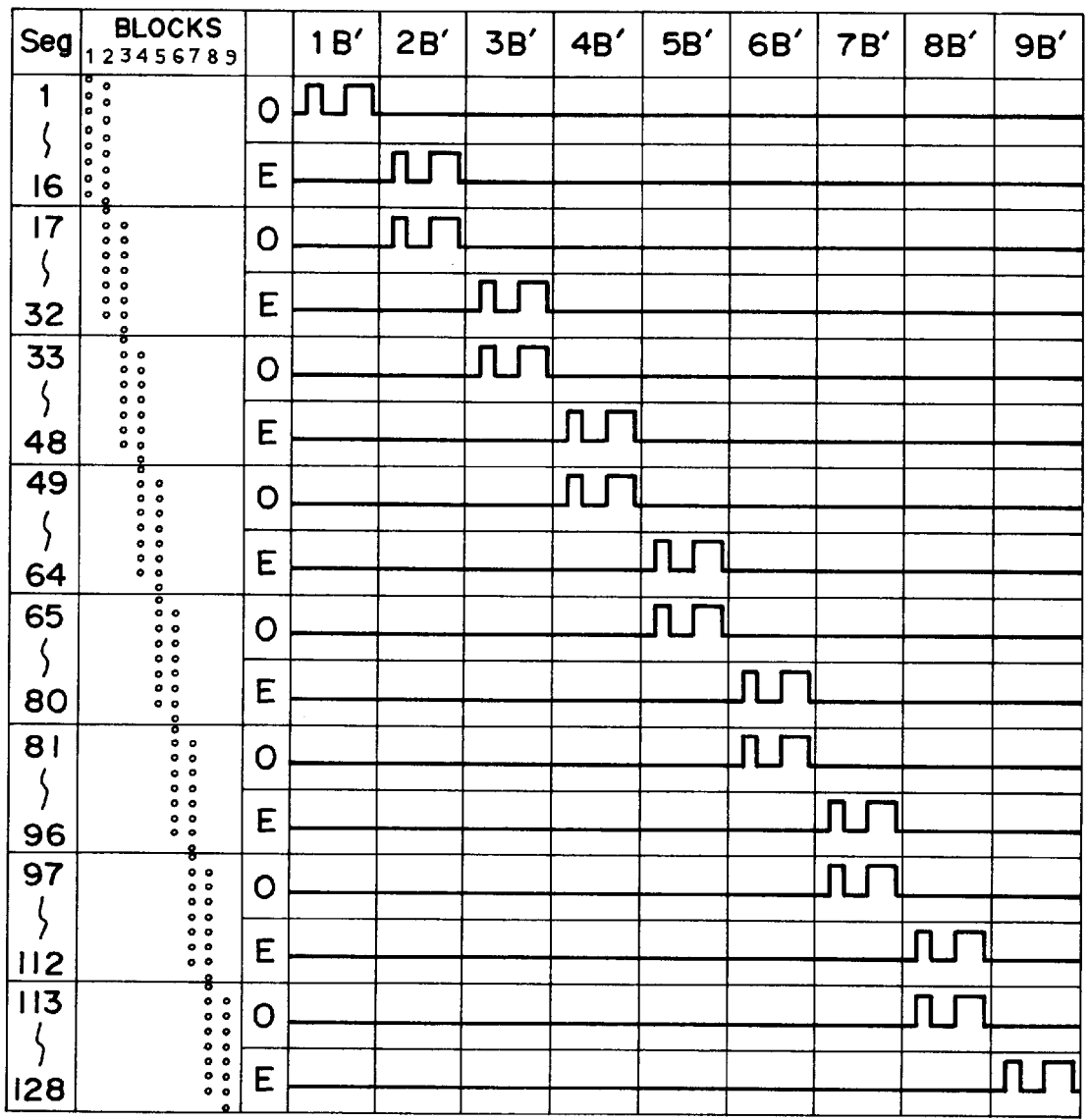
FIG. 25 shows a driving waveform of a fine driving method according to Embodiment 2.
Figure 25:
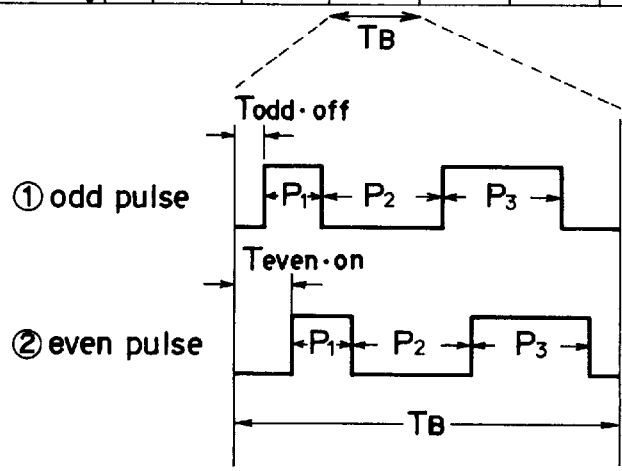

As for the three density levels for color image, the order of prints by one head is as shown in FIG. 25, when the multi-color integral recording head of this embodiment is used.

That is, in the first scan (path), 32 nozzle printing is effected for black. Then, the sheet is deviated by 32 nozzles, and the second scan is carried out to effect 24 nozzle printing for cyan (32 nozzle printing for the second line for black).

The sheet is deviated by 32 nozzles, and the third scan is carried out to effect 8 nozzle print for cyan (32 nozzle printing for the third line for the black, and 24 nozzle printing for the second line for the cyan).

The sheet is deviated by 32 nozzles, and the fourth scan is carried out to effect 24 nozzle printing for magenta (32 nozzle printing for the fourth line for black, 8 nozzle printing for the third line for cyan, 24 nozzle printing for the second line for cyan).

The sheet is deviated by 32 nozzles, and the fifth scan is carried out to effect 24 nozzle printing for yellow (32 nozzle printing for the fifth line for black, 8 nozzles for the fourth line for cyan, 24 nozzles for the third line for cyan, a nozzle printing for the second line for magenta).

The sheet is deviated by 32 nozzles, and the sixth scan is carried out to effect 24 nozzle printing for yellow (32 nozzle printing for the sixth line for black, 8 nozzle printing for the fifth line for cyan, 24 nozzle printing for the fourth line for cyan, 8 nozzle printing for the third line for magenta, 8 nozzle printing for the second line for yellow).

In this manner, dark color printing is carried out for one line with one dye density by six scans.

In the similar manner, four color three level density record is accomplished by sequentially driving the different density (light ink) head.

The description will be made as to the process of the density recording in the case of full-color recording using four color (BK, C, M and Y) each with 3 densities (3 tones).

The order of print is BK (1 (N1), 2 (T1)), C (1 (N1), 2 (T2)), M (1 (N1), 2 (T1)), Y (1 (N1), 2 (T1)), where 1 (N1) indicated dark ink, 2 (T1) is light ink. To reproduced tone levels, the number of droplets per pixel for each color is changed among 0, 1 and 2. Thus, 3 tone levels are reproducible, and the quantity of the ink per pixel for each color is 40 (ng/dot). However, the maximum ink quantity per pixel is limited to 80 (ng/dot) (corresponding to approx. 2.0 color), by image processing (dark-light splitting table, or three level processing or the like).

Figure 29:
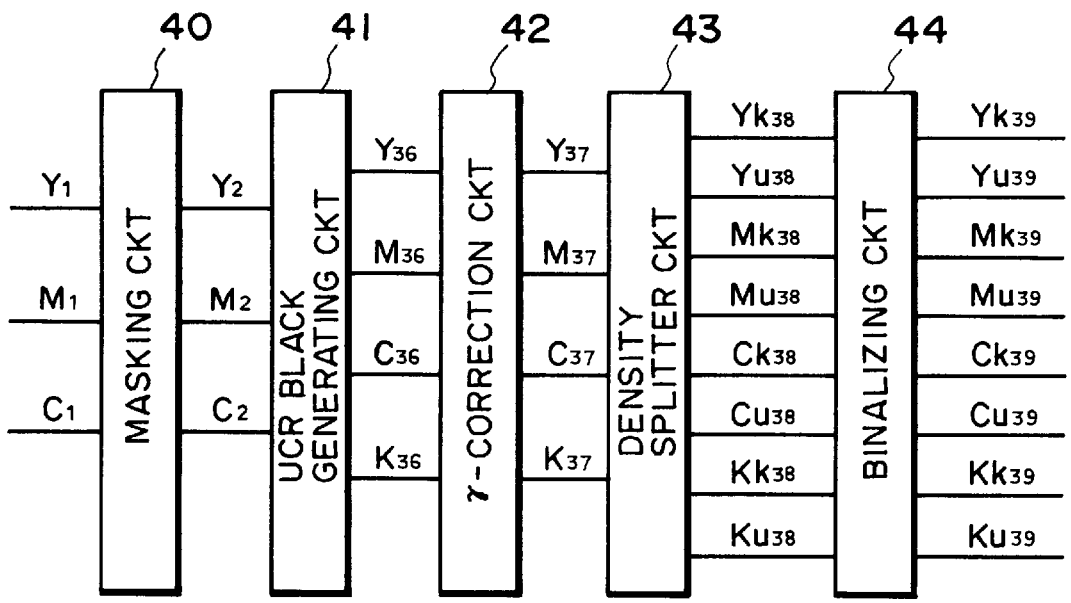
FIG. 29 is a block diagram of image processing according to Embodiment 3.
Figure 30:
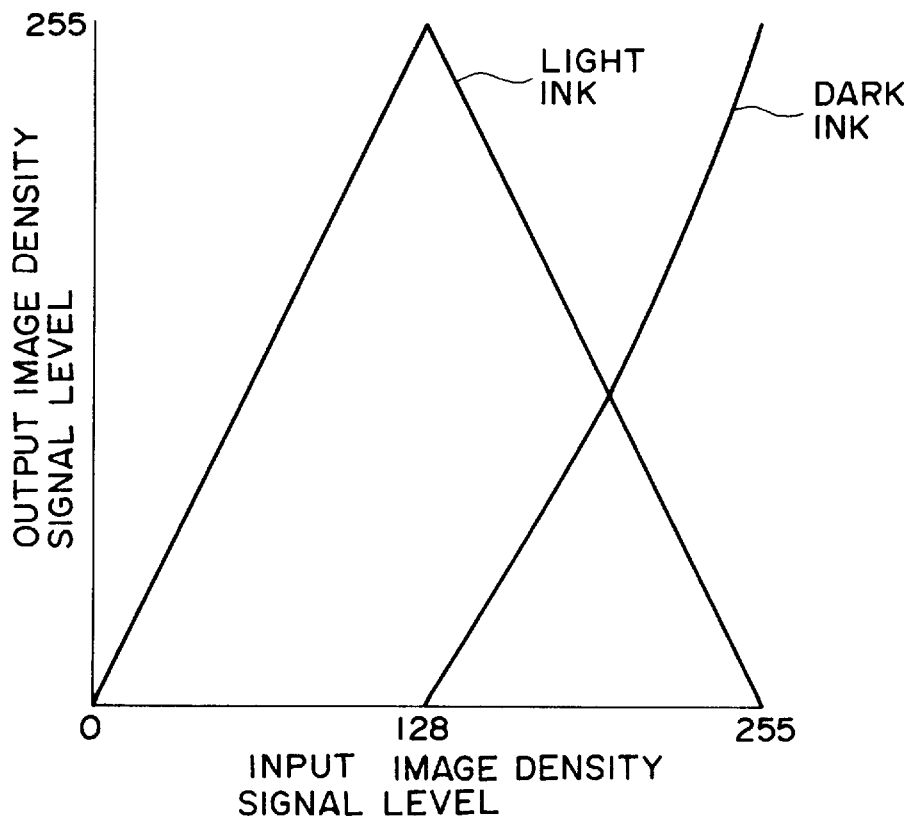
FIG. 30 is a table of density splitting in Embodiment 3.

In this embodiment, the use is made with an image processing block shown in FIG. 29, and by the density splitting table shown in FIG. 30, the dark ink and the light ink arc used while splitting on the basis of the density data of the image. The foregoing description has been made with respect to one color, but the similar printing operation is effected for each of the other color, so that full-colors of high tone reproducibility can be provided without difficulty.

When various images are recorded using the method described above, the manufacturing cost of the main assembly is not increased, and the number of required carriages is not increased, because the three density level recording is possible without increasing the number of heads, as contrasted to the conventional printing using dark ink only. In addition, the number of tone levels can be increased without reduction of the reliability of the head, and therefore, fine high contrast images can be printed without non-uniformity or stripes.

In this embodiment, three level density recording is effected using two heads, but it is a possible alternative that the number of heads is increased, by which four level or five level recording is carried out using 3 or 4 heads By using interlace drive at this time, good image stability can be provided even if high frequency drive is carried out.

In addition, since the ejection regions of the nozzles constituting, the blocks are partly overlapped, the disturbance to the linearity can be reduced.

1. 4 pattern fine drive

Figure 31:
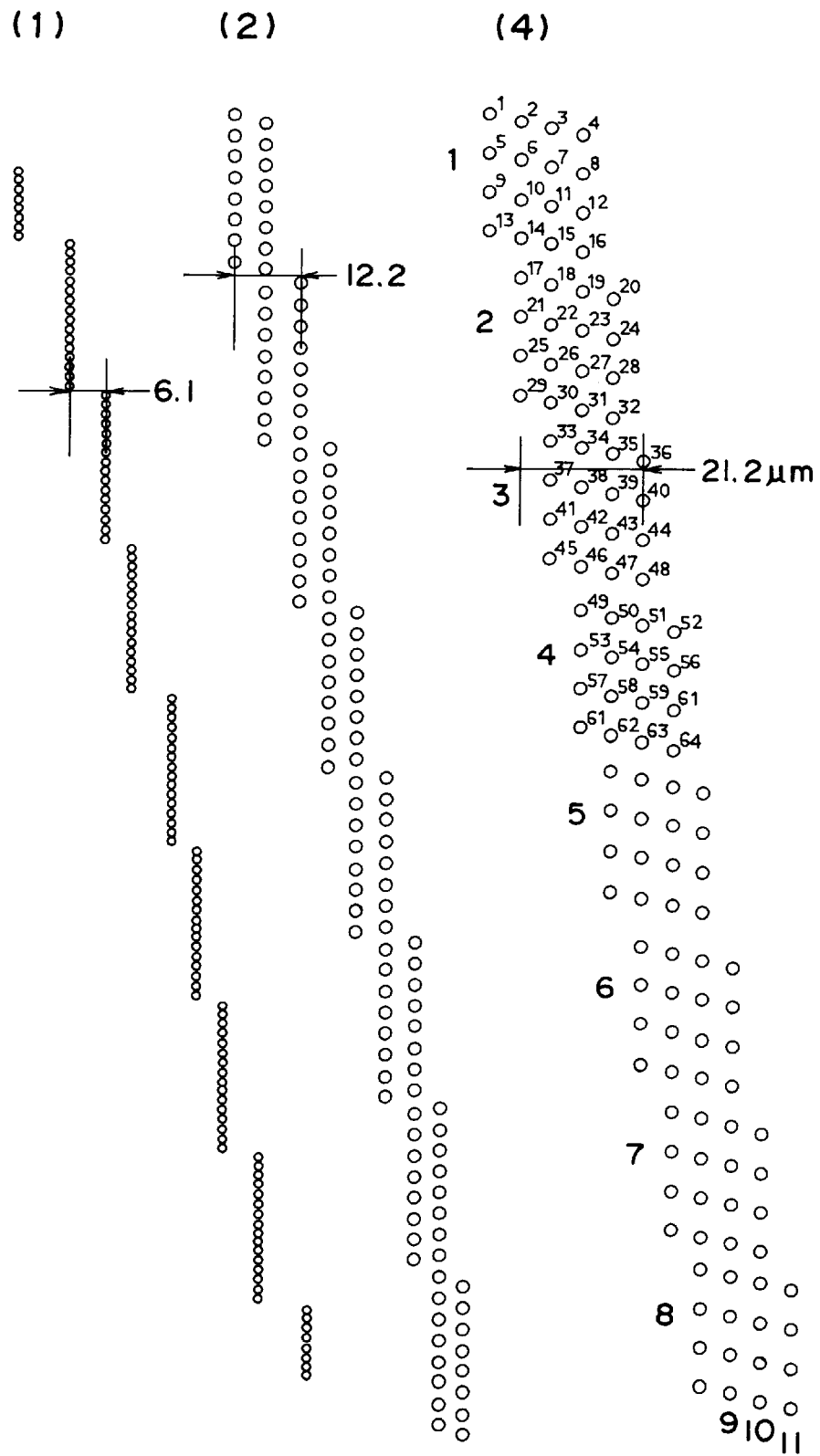
FIG. 31 illustrates a fine drive using multiple patterns according to another embodiment.

In FIG. 31, (4), an example of 11 block fine drive is illustrated as a method for further reducing the influence of the liquid crosstalk, as a modification of the fine drive. According to this embodiment, the direct liquid crosstalk due to the adjacent nozzles can be reduced, and the number of nozzles which are actuated for ejection simultaneously at the adjacent locations, is decreased.

First, 4 odd-number nozzles 1, 5, 9 and 13 of the first block are simultaneously actuated by double pulses. Subsequently, 8 even number nozzles 2, 6, 10, 14, 18, 22, 26 and 30 of the second block are actuated by double pulses after double pulse drive for odd number nozzles of the first block.

Then, 12 odd number nozzles 3, 7, 11, 15, 19, 23, 27, 31, 35, 39, 43 and 47 of the third block are simultaneously actuated by double pulses for the odd-numbers for the third block after double pulse drive for the even number nozzles of the second block.

Subsequently, 16 even number segments 4, 8, 12, 16, 20, 24, 28, 32, 36, 40, 44, 48, 52, 56, 60 and 64 of the fourth block, are simultaneously actuated.

The fine drive is continued to the odd number nozzles of number 11 block in the similar manner. By doing so, the influence of the liquid crosstalk for each column can be reduced. In the Figure, (1) illustrates an method of sequential drive for the blocks divided so that the ejection regions are not overlapped, and (2) shows a sequential drive for the block divided for ½ overlapping in the ejection region.

The similar advantageous effects can be provided with a multi-block structure using N patterns.

2. Single pulse fine drive

Figure 32:
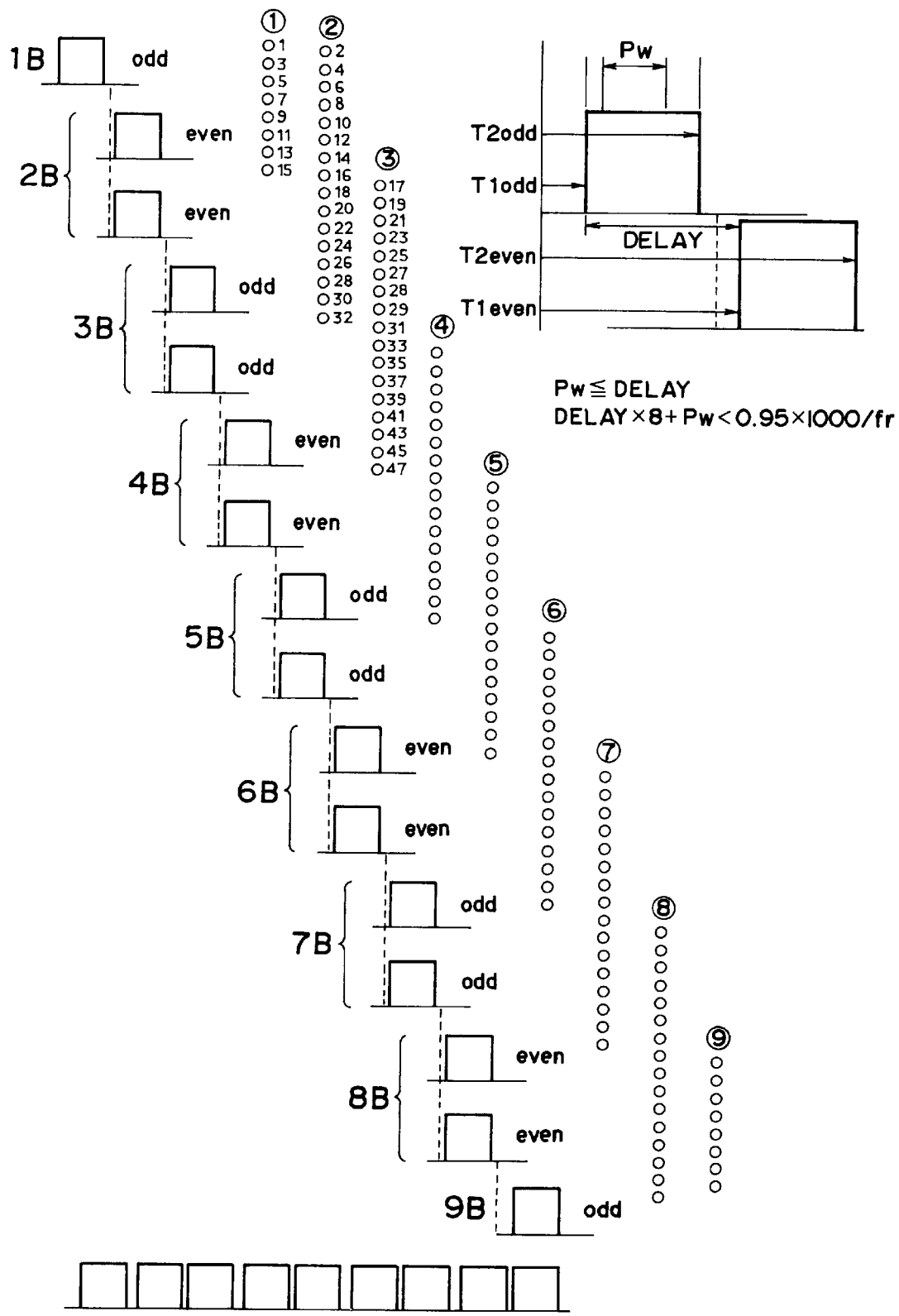
FIG. 32 illustrates fine drive using single pulse according to a further embodiment of the present invention.

FIG. 32 shows a modification of fine drive, using single pulse. In this embodiment, similarly to the foregoing embodiments using multiple pulses for the ejection amount control, the effects of reduction of the liquid crosstalk by the fine drive, and the reduction of the disturbance to the linearity thereby, can be provided.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals.

By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable Lo an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced Lo the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

As described in the foregoing, according to the present invention, the influence of the crosstalk can be reduced to a half by the fine drive, while enjoying the reduction of the maximum retraction of the refilling due to the offset drive. The step or disturbance to the linearity due to the time offset among the blocks can be suppressed, whereby further increases in the speed and the quality can be provided.

While the invention has been described with reference to the structures disclosed herein, it i s not confined to the details set forth and this application is intended to cover such modifications or changes as may come within the purposes of the improvements or the scope of the following claims.

What is claimed is:

1. An ink jet recording method using a number of ejection outlets for ejecting ink, arranged in a line, said method comprising the steps of:

grouping a number of ejection outlets into a plurality of groups in which the ejection outlets eject the ink substantially simultaneously, wherein ejection outlets in each group of the plurality of groups define an area containing all of the ejection outlets in a respective group, and respective areas of adjacent groups of the plurality of groups partially overlap, and respective areas of non-adjacent groups of the plurality of groups do not overlap; and supplying driving signals in such an order that ejection outlets in adjacent groups are driven such that adjacent groups sequentially eject ink and corresponding areas of the adjacent groups overlap.

2. A method according to claim 1, wherein the group consists of even number or odd number ejection outlets.

3. A method according to claim 1, wherein said driving signals each comprises a plurality of pulses.

4. A method according to claim 1, wherein the driving signals each comprises a single pulse.

5. A method according to claim 1, wherein the ink is ejected by thermal energy.

6. An ink jet recording apparatus for effecting recording by ejecting ink through a number of ejection outlets, arranged in a line, comprising:

a plurality of groups of ejection outlets which eject ink substantially simultaneously, wherein ejection outlets in each group of the plurality of groups define an area containing all of the ejection outlets in a respective group, and respective areas of adjacent groups partially overlap, and respective areas of non-adjacent groups of the plurality of groups do not overlap; and signal supplying means for supplying driving signals in such an order that ejection outlets in adjacent groups are driven such that adjacent groups sequentially eject ink and corresponding areas of the adjacent groups overlap.

7. An apparatus according to claim 6, wherein the group consists of even number or odd number ejection outlets.

8. An apparatus according to claim 6, wherein said driving signals each comprises a plurality of pulses.

9. An apparatus according to claim 6, wherein the driving signals each comprises a single pulse.

10. An apparatus according to claim 6, wherein the ink is ejected by thermal energy.

11. An apparatus according to claim 6, further comprising a carriage for mounting a recording head having said ejection outlets.

12. An apparatus according to claim 6, further comprising feeding means for feeding a recording material, on which recording is effected by said ejection outlets.

13. An apparatus according to claim 6, wherein said recording apparatus is a copying machine.

14. An apparatus according to claim 6, wherein said apparatus is a facsimile machine.

15. An apparatus according to claim 6, wherein said recording apparatus is a terminal of a computer.

* * * * *

UNITED STATES PATENT AND TRADEMARK OFFICE
CERTIFICATE OF CORRECTION

PATENT NO. : 5,907,337

DATED : May 25, 1999

INVENTOR(S) : HIROSHI TAJIKA, ET AL.

It is certified that error appears in the above-identified patent and that said Letters Patent is hereby corrected as shown below:

SHEET 13

Figure 13:
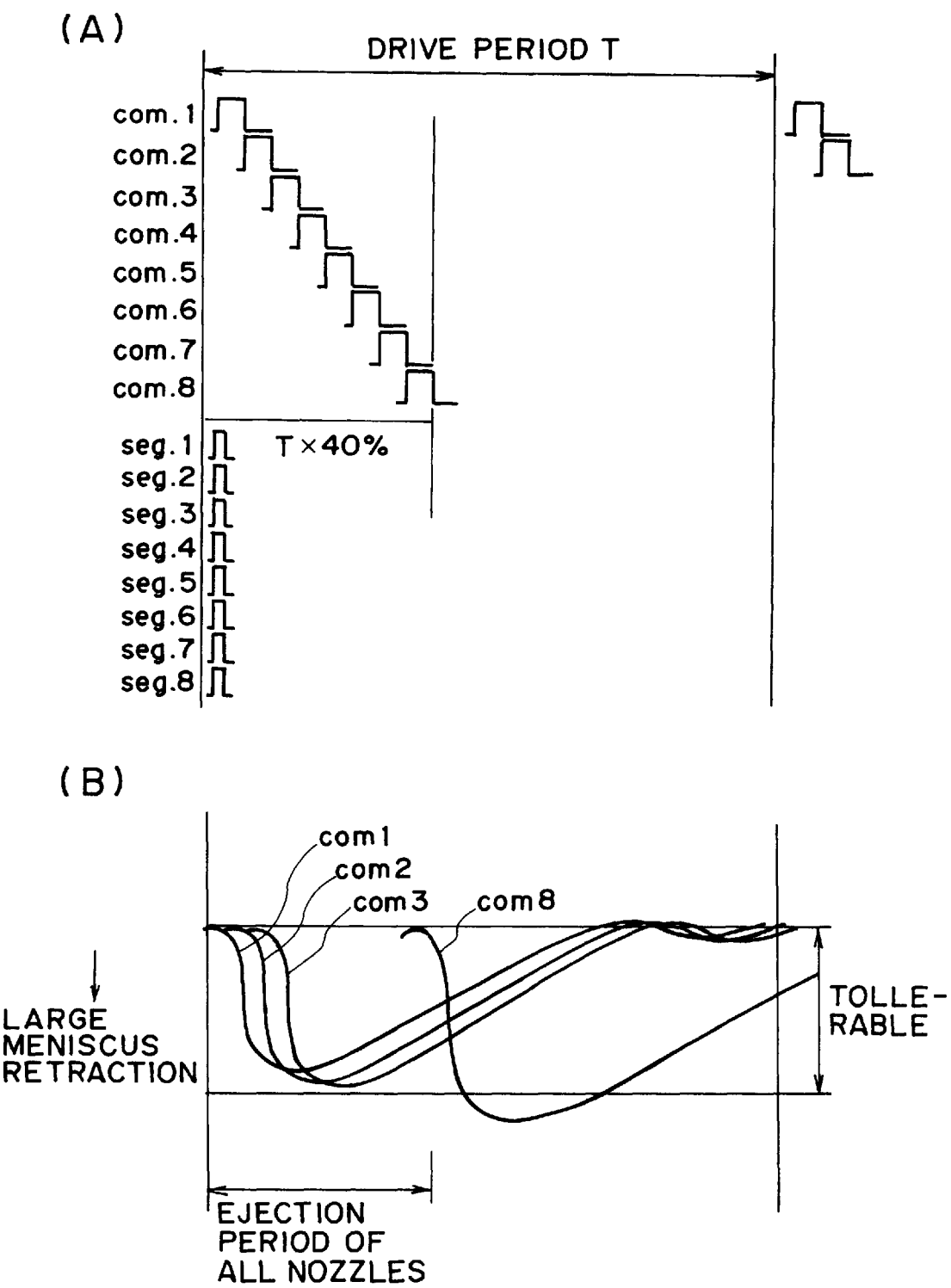
FIG. 13 illustrates an offset drive according to this invention.
Figure 14:
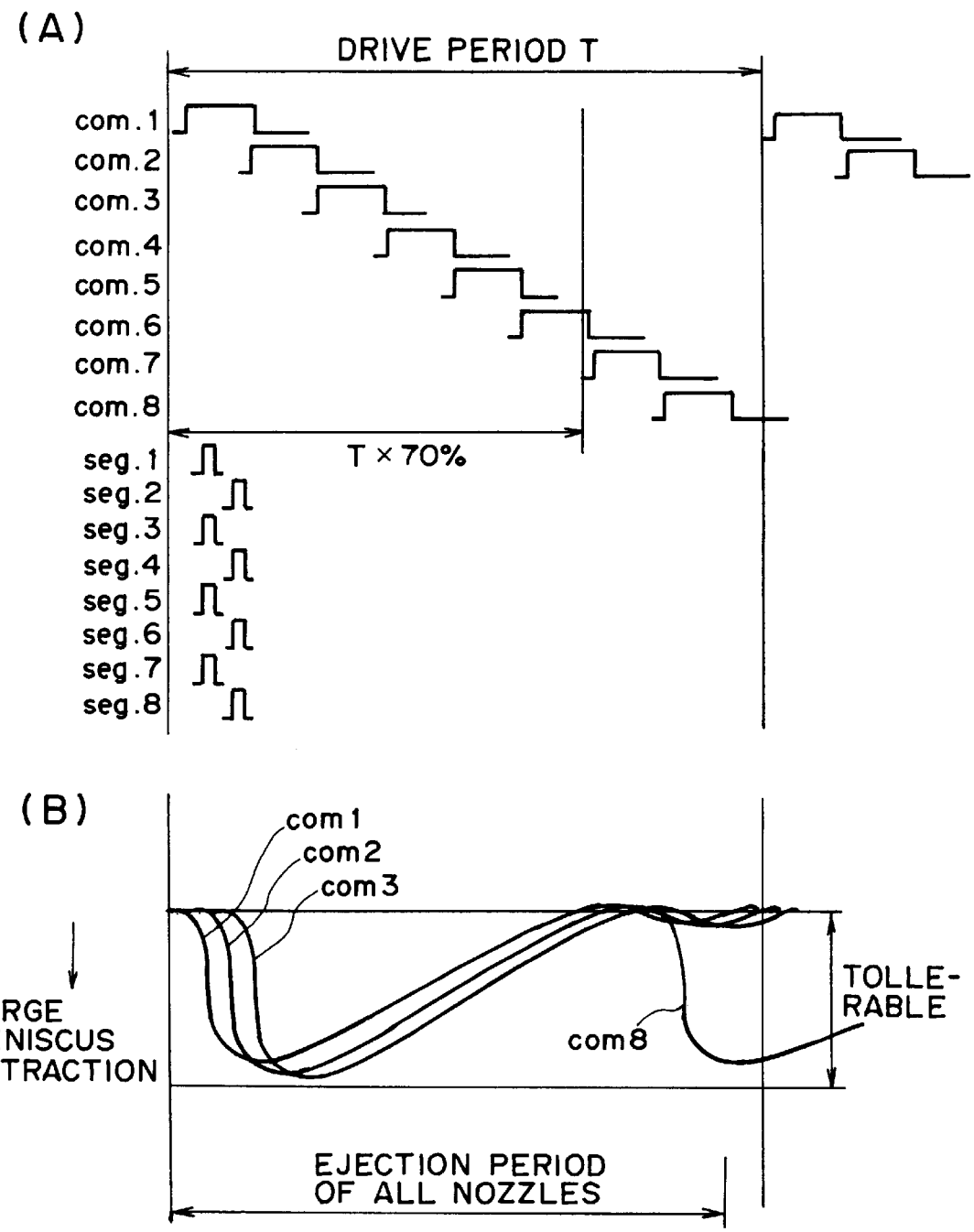
FIG. 14 is a third illustration of an offset drive according to this invention.

FIG. 13, "TOLLERABLE" should read --TOLERABLE--.

SHEET 14

FIG. 14, "TOLLERABLE" should read --TOLERABLE--.

COLUMN 1

Line 41, "of a short" should read --short of a--.
    Line 47, "does" should read --is--.
    Line 57, "near" should read --near the--.

UNITED STATES PATENT AND TRADEMARK OFFICE
CERTIFICATE OF CORRECTION

PATENT NO. : 5,907,337

DATED : May 25, 1999

INVENTOR(S) : HIROSHI TAJIKA, ET AL.

It is certified that error appears in the above-identified patent and that said Letters Patent is hereby corrected as shown below:

COLUMN 2

Line 8, "Is," should read --is,--.
    Line 22, "dots," should read --dot,--.

COLUMN 3

Line 2, "number" (second occurrence) should be deleted.

COLUMN 4

Line 13, "driving." should read --drive--.

COLUMN 6

Line 27, "heatEN-B" should read --heat EN-B,--.
    Line 31, "CLK-R, U/D" should read --CLK-B, U/D,--.

COLUMN 7

Line 9, "pulse" should read --pulse.--.
    Line 10, "block A4," should read --block A-4,--.
    Line 34, "are" should read --is--.

UNITED STATES PATENT AND TRADEMARK OFFICE
CERTIFICATE OF CORRECTION

PATENT NO. : 5,907,337
DATED : May 25, 1999
INVENTOR(S) : HIROSHI TAJIKA, ET AL.

It is certified that error appears in the above-identified patent and that said Letters Patent is hereby corrected as shown below:

COLUMN 10

Line 14, "position:" should read --position;--.
    Line 50, "is" should read --are--.

COLUMN 11

Line 56, "nigh" should read --high--.

COLUMN 12

Line 33, "363" should read --36,--.
    Line 35, "to" should be deleted.

COLUMN 13

Line 47, "includes" should read --include--.

COLUMN 14

Line 65, "heads" should read --head.--.

COLUMN 17

Line 30, "an" should read --a--.

UNITED STATES PATENT AND TRADEMARK OFFICE
CERTIFICATE OF CORRECTION

PATENT NO.   :   5,907,337
DATED        :   May 25, 1999
INVENTOR(S)  :   HIROSHI TAJIKA, ET AL.

It is certified that error appears in the above-identified patent and that said Letters Patent is hereby corrected as shown below:

COLUMN 18

Line 54, "Lo" should read --to--.

COLUMN 19

Line 1, "is" should read --in--.
    Line 17, "Lo" should read --to--.
    Line 33, "i s" should read --is--.

Signed and Sealed this

Sixteenth Day of January, 2001

Attest:

Q. TODD DICKINSON

*Attesting Officer*        *Commissioner of Patents and Trademarks*

UNITED STATES PATENT AND TRADEMARK OFFICE
CERTIFICATE OF CORRECTION

PATENT NO. : 5,907,337  
DATED : May 25, 1999  
INVENTOR(S) : Hiroshi Tajika, et al.

Page 1 of 1

It is certified that error appears in the above-identified patent and that said Letters Patent is hereby corrected as shown below:

References Cited,
Item [56], U.S. PATENT DOCUMENTS Insert
-- 4,611,219   9/1986  Sugitani et al ..... -- .

FOREIGN PATENT DOCUMENTS
Insert -- 308272     3/1989   European Patent Off. --, and
       -- 339926    11/1989   European Patent Off. --.

Signed and Sealed this

Ninth Day of October, 2001

*Attest:*

*Attesting Officer*

NICHOLAS P. GODICI
*Acting Director of the United States Patent and Trademark Office*